(12) United States Patent
Javaid et al.

(10) Patent No.: US 12,531,754 B2
(45) Date of Patent: Jan. 20, 2026

(54) BLOCKCHAIN MACHINE COMPUTE ACCELERATION ENGINE WITH OUT-OF-ORDER SUPPORT

(71) Applicant: XILINX, INC., San Jose, CA (US)

(72) Inventors: Haris Javaid, Singapore (SG); Ji Yang, San Jose, CA (US); Sundararajarao Mohan, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 397 days.

(21) Appl. No.: 17/729,955

(22) Filed: Apr. 26, 2022

(65) Prior Publication Data
US 2023/0342151 A1   Oct. 26, 2023

(51) Int. Cl.
*H04L 9/00* (2022.01)
*G06F 15/78* (2006.01)
*H04L 9/08* (2006.01)

(52) U.S. Cl.
CPC ............ *H04L 9/50* (2022.05); *G06F 15/7807* (2013.01); *H04L 9/0825* (2013.01)

(58) Field of Classification Search
CPC ............................... H04L 9/50; H04L 9/0825
See application file for complete search history.

(56) References Cited

U.S. PATENT DOCUMENTS

| | | | |
|---|---|---|---|
| 10,375,105 B2 | 8/2019 | Kozloski et al. | |
| 10,762,479 B2 | 9/2020 | Hyun et al. | |
| 2018/0374086 A1* | 12/2018 | Ardashev | G06F 16/219 |
| 2019/0026146 A1* | 1/2019 | Peffers | G06F 9/5044 |
| 2019/0370806 A1 | 12/2019 | Wang et al. | |
| 2020/0103930 A1 | 4/2020 | Suresh et al. | |
| 2020/0143088 A1 | 5/2020 | Sunkavalli et al. | |
| 2022/0131704 A1* | 4/2022 | Javaid | G09C 1/00 |

FOREIGN PATENT DOCUMENTS

| | | | |
|---|---|---|---|
| EP | 3432146 A1 | 1/2019 | |
| GB | 2612336 A * | 5/2023 | G06F 21/64 |

OTHER PUBLICATIONS

Nathan, Senthil, et al. "Blockchain meets database: Design and implementation of a blockchain relational database." arXiv preprint arXiv:1903.01919 (2019). (Year: 2019).*

(Continued)

*Primary Examiner* — Madhuri R Herzog
(74) *Attorney, Agent, or Firm* — Patterson + Sheridan, LLP

(57) ABSTRACT

Embodiments herein describe a hardware accelerator for a blockchain node. The hardware accelerator is used to perform a validation operation to validate one or more transactions before those transactions are committed to a ledger of a blockchain. The embodiments herein describe an out-of-order validation scheme where a collector is used to collect validated transactions out of order. Thus, if a validation pipeline has finished validating a later transaction before another validation pipeline has finished validating an earlier transaction, the pipeline can nonetheless send its results to the collector and retrieve another transaction from a scheduler. In this manner, the downtime for the validation pipelines is reduced or eliminated.

20 Claims, 13 Drawing Sheets

(56) References Cited

OTHER PUBLICATIONS

Kuhring, Lucas, et al. "Streamchain: Building a low-latency permissioned blockchain for enterprise use-cases." 2021 IEEE International Conference on Blockchain (Blockchain). IEEE, 2021. (Year: 2021).*

Lin, Wenmin, et al. "A proof-of-majority consensus protocol for blockchain-enabled collaboration infrastructure of 5G network slice brokers." Proceedings of the 2nd ACM International Symposium on Blockchain and Secure Critical Infrastructure. 2020. (Year: 2020).*

U.S. Appl. No. 17/083,195, filed Oct. 28, 2020 Entitled "Blockchain Machine Compute Acceleration Engine".

* cited by examiner

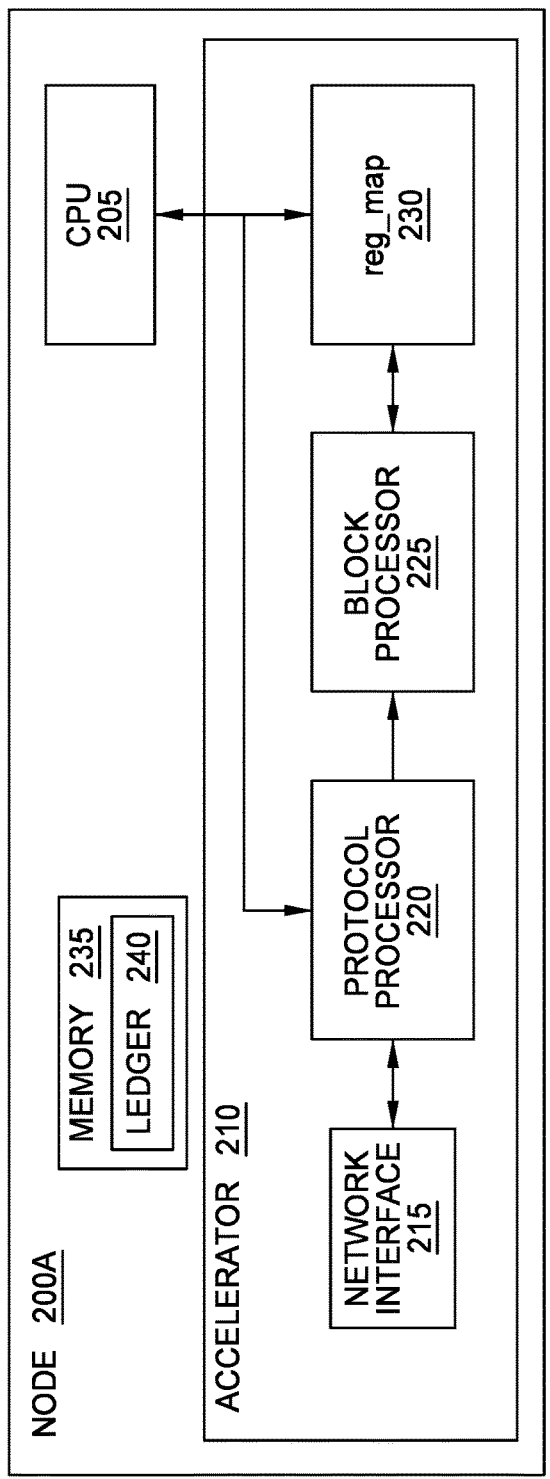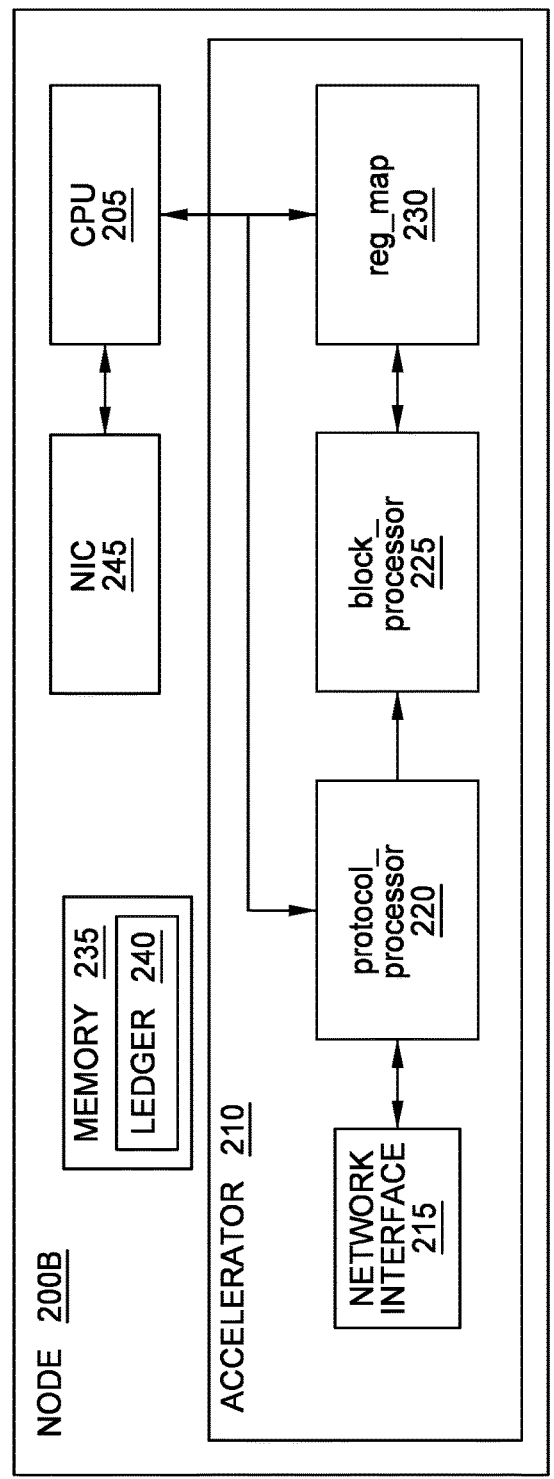

BLOCKCHAIN MACHINE COMPUTE ACCELERATION ENGINE WITH OUT-OF-ORDER SUPPORT

TECHNICAL FIELD

Examples of the present disclosure generally relate to a hardware accelerator for a node in a blockchain.

BACKGROUND

Hyperledger Fabric is an open-source, enterprise-grade implementation platform for permissioned blockchains. The transaction flow in Hyperledger Fabric follows the execute-order-validate model, where a transaction is executed first, then ordered into a block, which is finally validated and committed to the ledger (along with a state database to keep the global state of the blocks committed so far). Consequently, a Fabric network includes different types of nodes, such as peers, orderers, clients, etc., where each node has an identity provided by the Membership Service Provider (MSP).

Permissioned blockchains (like Hyperledger Fabric, Quorum, Corda, and others) are blockchain networks that require access to be part of. These blockchains require transactions to be validated before they are added to the blockchain's ledger. However, the validation process must be performed by certain nodes which often experience a bottleneck when having to validate multiple transactions. This bottleneck can limit the ability of the blockchain to quickly commit new transactions.

SUMMARY

One embodiment describes an integrated circuit for accelerating a validation process for a blockchain. The integrated circuit includes a plurality of validation pipelines configured to validate a plurality of received transactions where each of the plurality of received transactions is assigned a sequence number in a block of transactions, a collector circuit configured to receive validation results from the plurality of validation pipelines in an out of order sequence relative to the sequence numbers, and a forwarder circuit configured to submit the validation results to be committed to the blockchain in an in-order-manner.

Another embodiment described herein is a method that includes receiving, at a hardware accelerator, a block of transactions to be committed to a ledger of a blockchain where each of the transaction in the block is assigned a sequence number, validating, each of the transactions in the block using a plurality of validation pipelines in the hardware accelerator, transmitting, from the plurality of validation pipelines, validation results in an out of order sequence to a collector circuit in the hardware accelerator, and committing, using a forwarder circuit in the hardware accelerator, the transactions to the ledger in an in-order-manner.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 2A and 2B are block diagrams of nodes in a blockchain with a hardware accelerator, according to an example.

DETAILED DESCRIPTION

Figure 1:
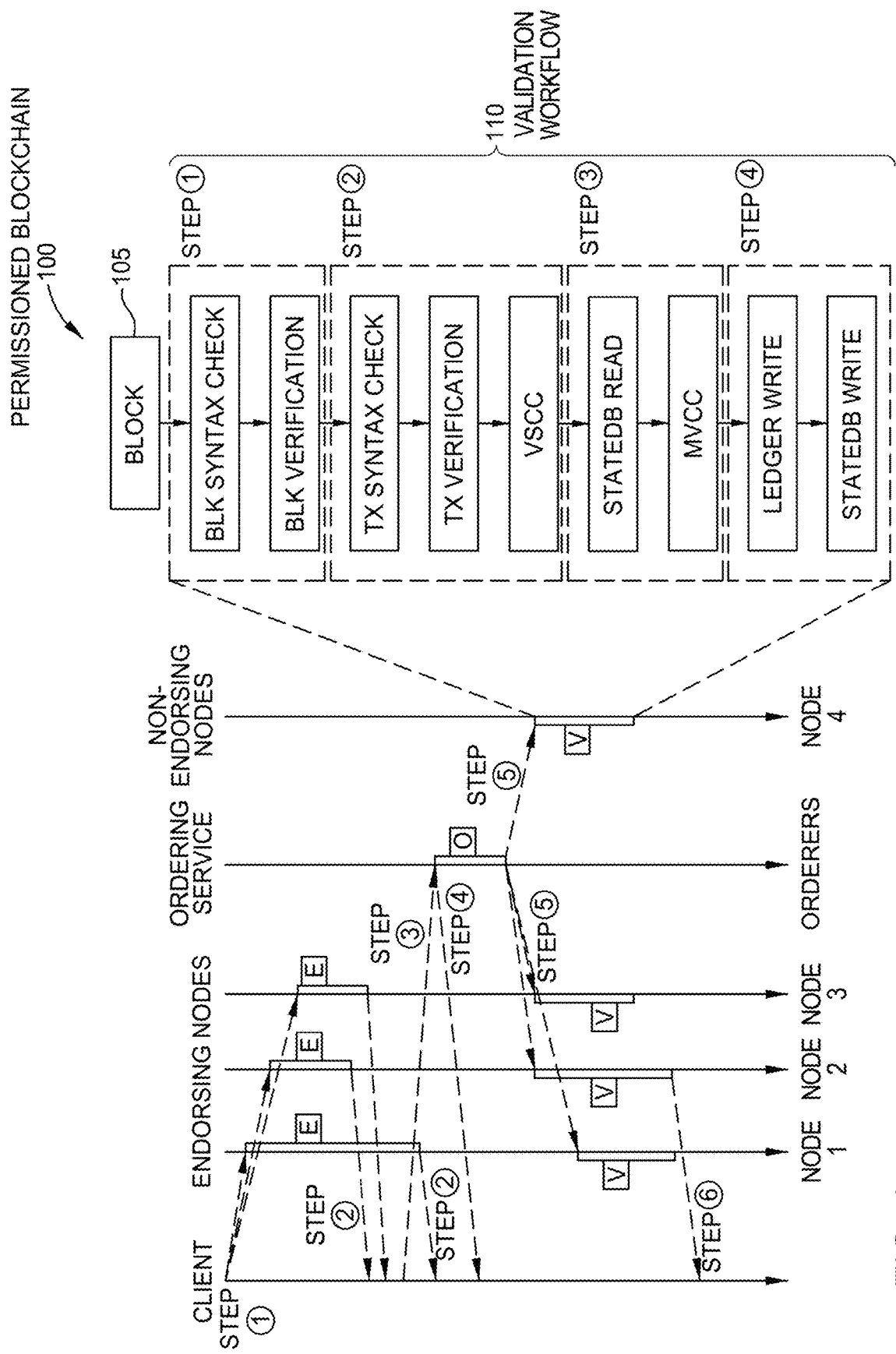
FIG. 1 is a timing chart corresponding to a permissioned blockchain, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a hardware accelerator (e.g., a compute acceleration engine) for a blockchain machine or node. The hardware accelerator is used to perform a validation operation to validate one or more transactions before those transactions are committed (i.e., added) to a ledger of a permissioned or permissionless blockchain. The blockchain may include multiple peer-nodes, each of which contains standard software running on a server or container. Some peer-nodes, known as validator nodes are the main bottleneck for system performance because they need to validate a block of several tens or hundreds of transactions quickly before those transactions can be committed into the blockchain ledger. Instead of validating the block of transactions using software, the hardware accelerator can validate the transactions in a fraction of the time. The peer-node software then gathers the validation results from the hardware accelerator and combines the results with received block data to derive the block, which is then committed to the stored ledger. In an experimental setup, a node with the hardware accelerator, when coupled to a networking acceleration engine, achieved more than 10× improvement in transaction commit throughput compared to a software only peer executing on a multi-core server.

The hardware verification process can be further improved by using an in-order approach to verifying the transactions. In one embodiment, the transactions should be committed in order but because the number of endorsements for each transactions may vary, different validation pipelines may finish processing transactions at different times. If a first validation pipeline finishes processing a later transaction before a second validation pipeline has finished processing an earlier transaction, in an in-order processing scheme the first validation pipeline sits idle until the second validation pipeline has finished. The embodiments herein describe an out-of-order validation scheme where a collector is used to collect validated transactions out of order. Thus, if a validation pipeline has finished validating a later transaction before another validation pipeline has finished validating an earlier transaction, the pipeline can nonetheless send its results to the collector and retrieve another transaction from a scheduler. In this manner, the downtime for the validation pipelines due to out-of-order validation is reduced or eliminated.

FIG. 1 is a timing chart corresponding to a permissioned blockchain 100, according to an example. While the timing chart of the permissioned blockchain 100 in FIG. 1 specifically pertains to the Hyperledger Fabric, the embodiments herein can apply to any type of permissioned blockchain. Further, the embodiments herein may also apply to non-permissioned blockchains that perform a validation process on transactions before those transactions are committed to the ledger. Thus, the Hyperledger Fabric is provided as just one example of a suitable blockchain network that can benefit from the hardware accelerator described below.

The transaction flow in the blockchain 100 follows an execute-order-validate model, where a transaction is executed first, then ordered into a block, which is finally validated and committed to the ledger (along with a state database to keep the global state of the blocks committed so far). Consequently, the permissioned blockchain 100 includes different types of nodes, such as peers, orderers, clients, etc., where each node has an identity provided by the MSP. This identify can be provided in the form of a certificate.

The client can be any entity that submits a transaction to be committed on the blockchain 100. For example, if the blockchain 100 is used by a financial institution to track money transfers, the client may submit a transaction to move funds from a first account to a second account (at the same financial institution or a different institution). At step 1, the client submits a transaction to be committed to the blockchain. Specifically, the transaction is received on multiple endorsing nodes (or peers). An endorsing node both executes/endorses transactions and validates/commits blocks to the ledger. Each endorsing node executes the transaction against its own state database, to compute the read-write set of the transaction (marked as E in FIG. 1). The read set is the keys accessed and their version numbers, while the write set is the keys to be updated with their new values.

If the endorsement process is successful (i.e., there are no errors), at step 2, the endorsing nodes add their endorsement to the transaction and return the transaction to the client. After the client has gathered a sufficient number of endorsements, at step 3, the client asks an ordering service to submit the transaction to a validation process. In one embodiment, the ordering service includes orderers (e.g., computing nodes) which use a consensus mechanism to establish a total order for the transactions. Multiple pluggable consensus mechanisms are available, such as Raft and Apache Kafka/Zookeeper based consensus mechanisms.

At step 4, the ordering service responds back to the client after the transaction has been accepted for inclusion into a block (step 4). The ordering service then creates a block 105 of transactions from the ordered transactions. In one embodiment, the ordering service creates the block 105 from the ordered transactions when either a user-configured timeout has expired or user-configured limit on block size is reached.

Once a block 105 is created, the ordering service broadcasts it to all the endorsing and non-endorsing nodes through, e.g., a Gossip protocol at step 5. Each node validates all the transactions in the block 105 and then commits the block to the ledger and state database (marked as V). Finally, one of the nodes sends a notification to the client that the transaction has been committed or whether the transaction was marked as invalid or valid in the ledger (step 6).

FIG. 1 shows a validation workflow 110 of the validation phase in more detail on the right-hand side. The workflow 110 shows four steps which are performed on every node that receives the block 105. On receiving the block 105 of transactions from the ordering service (or a lead node) through the Gossip protocol, at step 1, the node checks the syntactic structure of the block and verifies its signature, and then sends it through a pipeline of various operations which are described in more detail blow. In step 2, each transaction in the block is syntactically checked and its signature is verified.

Then validation system chaincode (VSCC) is run on each transaction where the endorsements are validated and the endorsement policy of the associated chaincode is evaluated. A transaction is marked as invalid if its endorsement policy is not satisfied.

In step 3, a multi-version concurrency control (MVCC) check is performed. This check ensures that there are no read-write conflicts between the valid transactions. In other words, it avoids the double-spending problem where two transactions are committed when only one transaction was intended. The read set of each transaction is computed again by accessing a state database (illustrated as "statedb" in FIG. 1) and is compared to the read set from the endorsement phase. If these read sets are different, then some other transaction (either in this block 105 or an earlier block) has already modified the same keys, and hence this transaction is marked as invalid.

In the final step 4, the block is committed to the stored ledger at the node. In one embodiment, the entire block is first written to the ledger with its transactions' valid/invalid flags. Then, the write sets of the valid transactions are committed to the state database.

FIGS. 2A and 2B are block diagrams of nodes 200 in a blockchain with a hardware accelerator 210, according to an example. In one embodiment, the node 200 is any computing system that performs a validation process when committing transactions to a blockchain. For example, the node 200 may be an endorsing or non-endorsing node or peer as shown in FIG. 1. In one embodiment, the node 200 is a server or other computing system.

In FIG. 2A, the node 200A includes a CPU 205, the hardware accelerator 210, and memory 235. The CPU 205 represents any number of processors that each can contain any number of processing cores. The memory 235 represents volatile memory, non-volatile memory (e.g., a hard disk drive), and combinations thereof. As shown, the memory 235 stores a ledger 240 which lists the committed transactions of a blockchain.

The hardware accelerator 210 contains various circuit elements for performing the validation workflow 110 illustrated in FIG. 1. In one embodiment, the hardware accelerator 210 is an integrated circuit. In another embodiment, the hardware accelerator 210 is a board (e.g., a printed circuit board (PCB) such as a PCIe card) on which one or more integrated circuits are mounted. In one embodiment, the integrated circuit is a field programmable gate array (e.g., FPGA) or a system on a chip (SoC) that comprises programmable logic. In this example, the various circuit blocks in the accelerator 210 are implemented in programmable logic. However, in another embodiment, the integrated circuit may be an application specific integrated circuit (ASIC) where the circuit blocks of the accelerator 210 are implemented only in hardened circuitry. While using an FPGA and SoC with programmable logic gives the accelerator 210 the flexibility to be reprogrammed if the validation process is changed, using an ASIC may save space.

The accelerator 210 includes a network interface 215 for receiving Ethernet packets containing data regarding the transactions, a protocol processor 220 for reformatting the data, a block processor 225 for performing the validation workflow, and a register map 230 (reg_map) (e.g., memory registers) which store the results of the validation. The protocol processor 220, the block processor 225, and the register map 230 are discussed in more detail below. In general, these hardware blocks work together to validate a received block of transactions. That is, the network interface 215 receives multiple packets which include data corresponding to a block of transactions. Because this data may be in a format that is unsuitable for processing, the protocol processor 220 can reformat and output the data for the block processor 225 for consumption. While the block processor 225 performs most of the steps in the validation workflow, some of these steps may be performed by the protocol processor 220 and the register map 230. Further, because the ledger 240 is stored in the memory 235 (which may not be directly accessible by the accelerator 210), the node 200A may rely on the CPU 205 to commit validated transactions to the ledger 240. That is, the accelerator 210 can store the validation results in the register map 230 which the CPU 205 can evaluate and then commit the transactions to the ledger. That is, in one embodiment all the transactions are committed to the ledge but the validation flags store the information about which ones were valid and which were invalid. However, for the state database (which is discussed below), only successfully validated transactions are committed. While most of the validation is performed in the hardware accelerator 210, committing the transactions to the ledger 240 may be performed by software executing on the CPU 205.

FIG. 2B illustrates a node 200B that is the same as the node 200A in FIG. 2A except for the addition of a network interface card (NIC) 245. In one embodiment, the NIC 245 provides the node 200B with the ability to determine what network traffic flows through the accelerator 210 and what network traffic flows through the NIC 245. In one embodiment, all traffic related to the blockchain may be sent through the accelerator 210 while received network traffic that is not related to the blockchain is processed by the NIC 245. In contrast, in node 200A all the network traffic received by the node 200A (whether blockchain or non-blockchain traffic) may be received at the accelerator 210. For example, the protocol processor 220 may forward the network traffic related to validation to the block processor 225 but forward all other traffic to the CPU 205.

In another embodiment, the accelerator 210 receives only the network traffic related to validating transactions at the accelerator 210 while all other traffic (whether it is other types of blockchain traffic such as an endorsement request, or non-blockchain traffic) is received and processed by the NIC 245.

In yet another embodiment not shown in either FIG. 2A or 2B, the accelerator 210 may perform all blockchain operations without the aid of the CPU 205. In that embodiment, the NIC 245 and the CPU 205 are not used to perform blockchain tasks, although the CPU 205 may be used to configure or control the accelerator 210. In this scenario, all network traffic goes through the accelerator 210 which processes the blockchain related packets but forwards other packets to/from the CPU 205.

Figure 3:
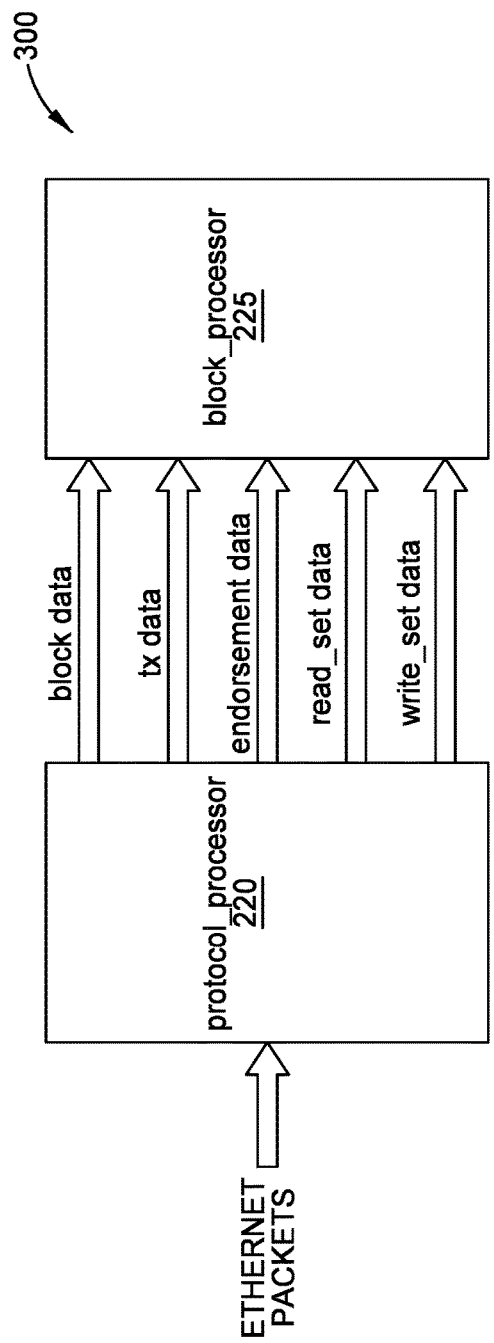
FIG. 3 illustrates an interface between a protocol processor and a block processor in the hardware accelerator, according to an example.

FIG. 3 illustrates an interface 300 between a protocol processor and block processor in the hardware accelerator, according to an example. In this example, the interface 300 is used to transmit block data, transaction data (labeled as tx data in FIG. 3), endorsement data, read set data, and write set data to the block processor 225. That is, the protocol processor 220 receives Ethernet packets from other nodes in the blockchain (e.g., from orderers in the ordering service) that contain the information used to validate a block of transactions. The protocol processor 220 then reformats/parses the data so that it can be consumed by the block processor 225.

Figure 4:
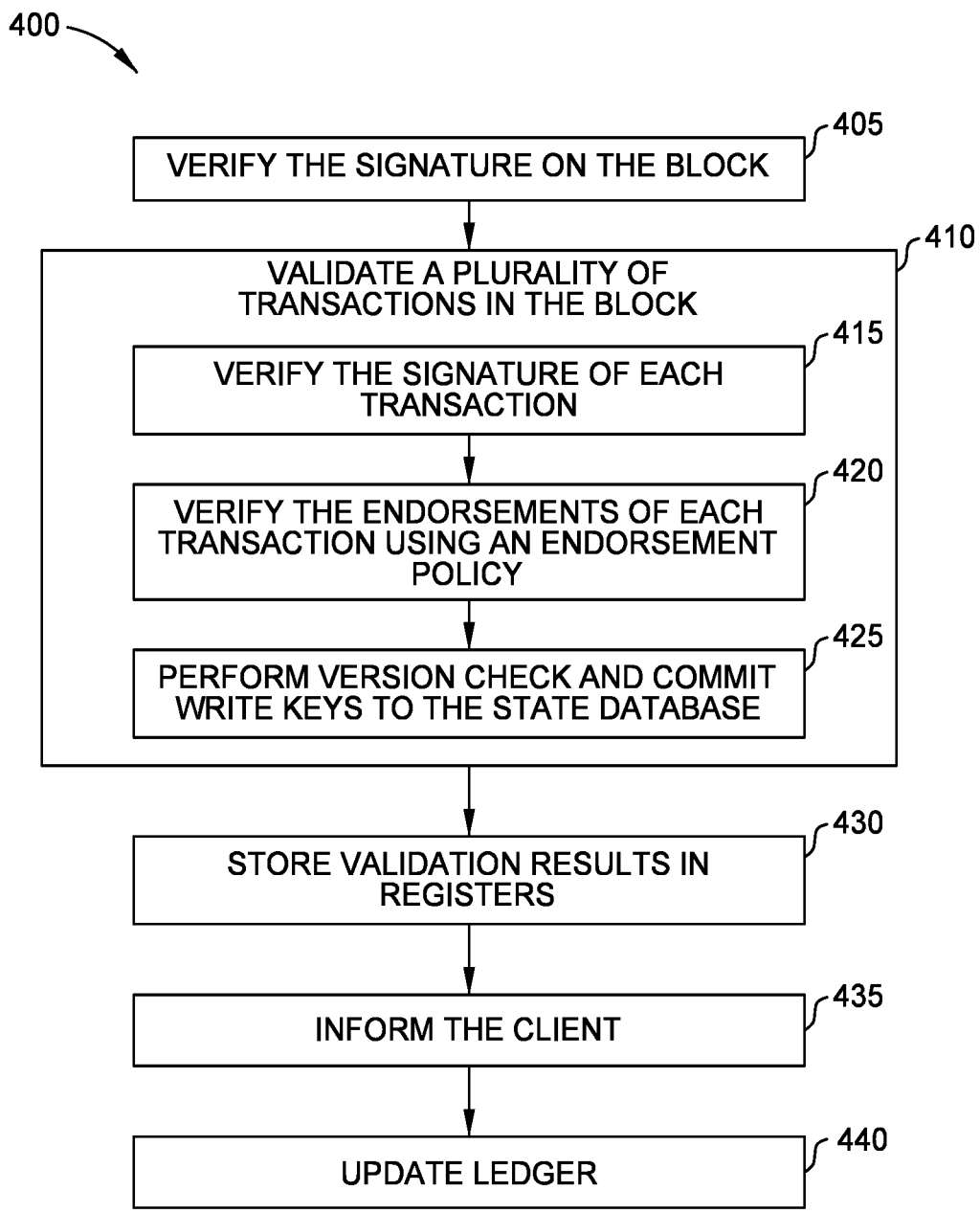
FIG. 4 is a flowchart for validating transactions before committing the transactions into a blockchain ledger, according to an example.

FIG. 4 is a flowchart of a method 400 for validating transactions before committing the transactions into a blockchain ledger, according to an example. For ease of explanation, the different stages in the method 400 are described in tandem with FIGS. 5-7 below. Further, the stages in the method 400 correlate to the steps 1-4 of the validation workflow 110 illustrated in FIG. 1.

The method 400 assumes that the hardware accelerator has already received a block of transactions from, e.g., an ordering service that need to be validated before they can be committed to the ledger. Further, the method 400 assumes that the protocol processor has performed a block syntax check (e.g., "blk syntax check" in FIG. 1) and a transaction syntax check (e.g., "tx syntax check" in FIG. 1) to confirm that all the required data for performing validation has been received.

Figure 5:
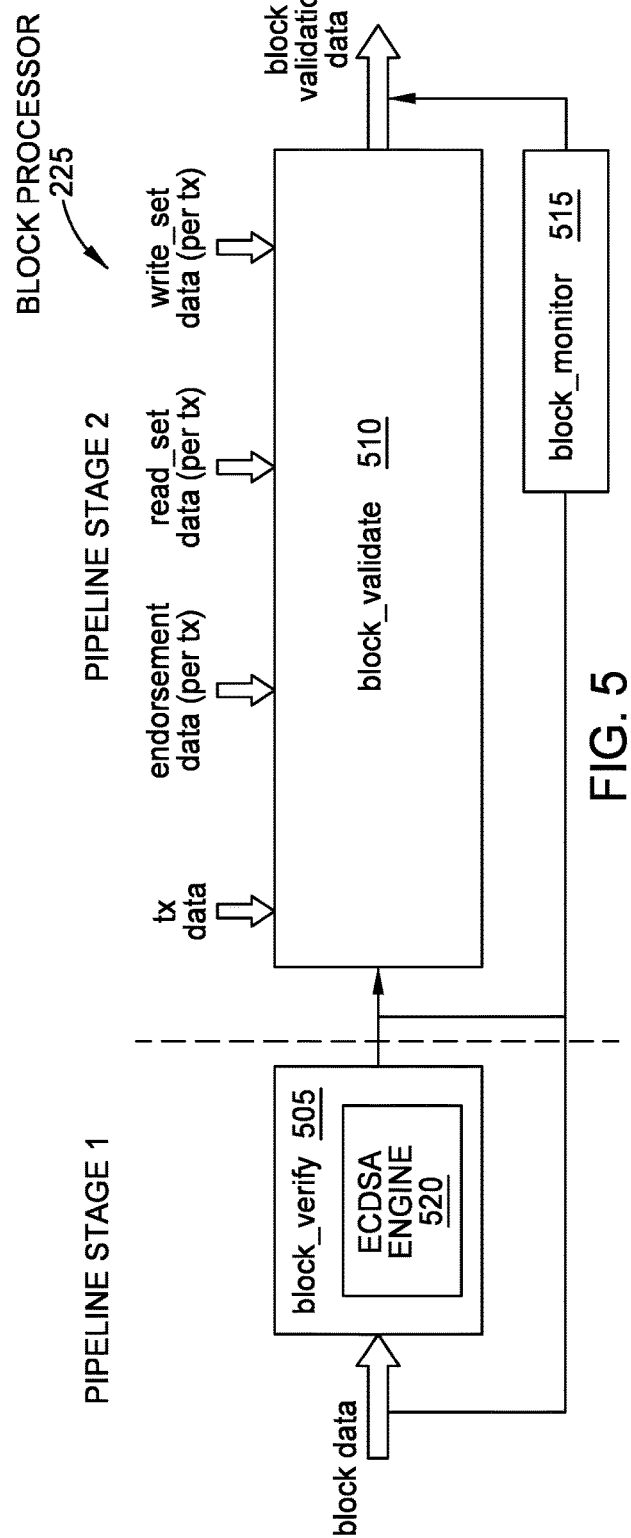
FIG. 5 is a block diagram of the block processor, according to an example.

At stage 405, the hardware accelerator verifies the signature on a block of transactions. More specifically, the block processor receives the information shown in FIG. 3 from the protocol processor so it can perform block verification. As shown in FIG. 5, the block processor 225 includes two hardware sub-modules: block verify 505 and block validate 510. The block verify 505 includes an elliptic curve digital signature algorithm (ECDSA) engine 520 for verifying that the orderer signature on the block. Put differently, the ECDSA engine 520 compares a received signature in the block to a known signature (e.g., certificate) for the orderer to ensure they match. That way, the block verify 505 can confirm that the block of transactions came from an approved node. While an ECDSA engine 520 is shown, any suitable signature algorithm engine can be used.

In addition to including the orderer signature, the block data received at the block verify 505 can also include a block number, the number of transactions in the block, and the like.

Returning to the method 400, at stage 410, the hardware accelerator validates the plurality of transactions in the block. In FIG. 5, this function is performed by the block validate 510. That is, while the block verify 505 ensures the block was received by a known orderer, the block validate 510 validates the individual transactions in the block. To do this, the block validate 510 receives the transaction data, endorsement data, read set data, and the write set data from the protocol processor (not shown in FIG. 5). The block validate 510 then outputs block validation data which contains validation results such as the block number, valid/invalid transaction flags, latency, and the like.

In one embodiment, the block verify 505 and block validate 510 are pipelined at a block-level. That is, the block processor 225 can processes a first block of transactions at the block verify 505 (pipeline stage 1) while the block validate 510 processes a second block of transactions (pipeline stage 2). Put differently, the block verify 505 can use the ECDSA engine 520 to ensure an authorized orderer transmitted the first block at the same time the block validate 510 validates the individual transactions in a second block.

The block processor 225 also includes a block monitor 515 which gathers block-level and transaction-level statistics by monitoring signals received from the block verify 505 and the block validate 510. For example, the block monitor 515 may determine the time or latency required to validate the blocks of transactions, or the throughput of the block processor 225 (e.g., the number of blocks processed per unit of time).

Further, FIG. 4 illustrates that stage 410 can be subdivided into stages 415-425. In one embodiment, stages 415-425 of the method 400 correspond to the pipeline stages 2a, 2b, and 2c in FIG. 6 which illustrates a more detailed view of the block validate 510 in FIG. 5.

Figure 6:
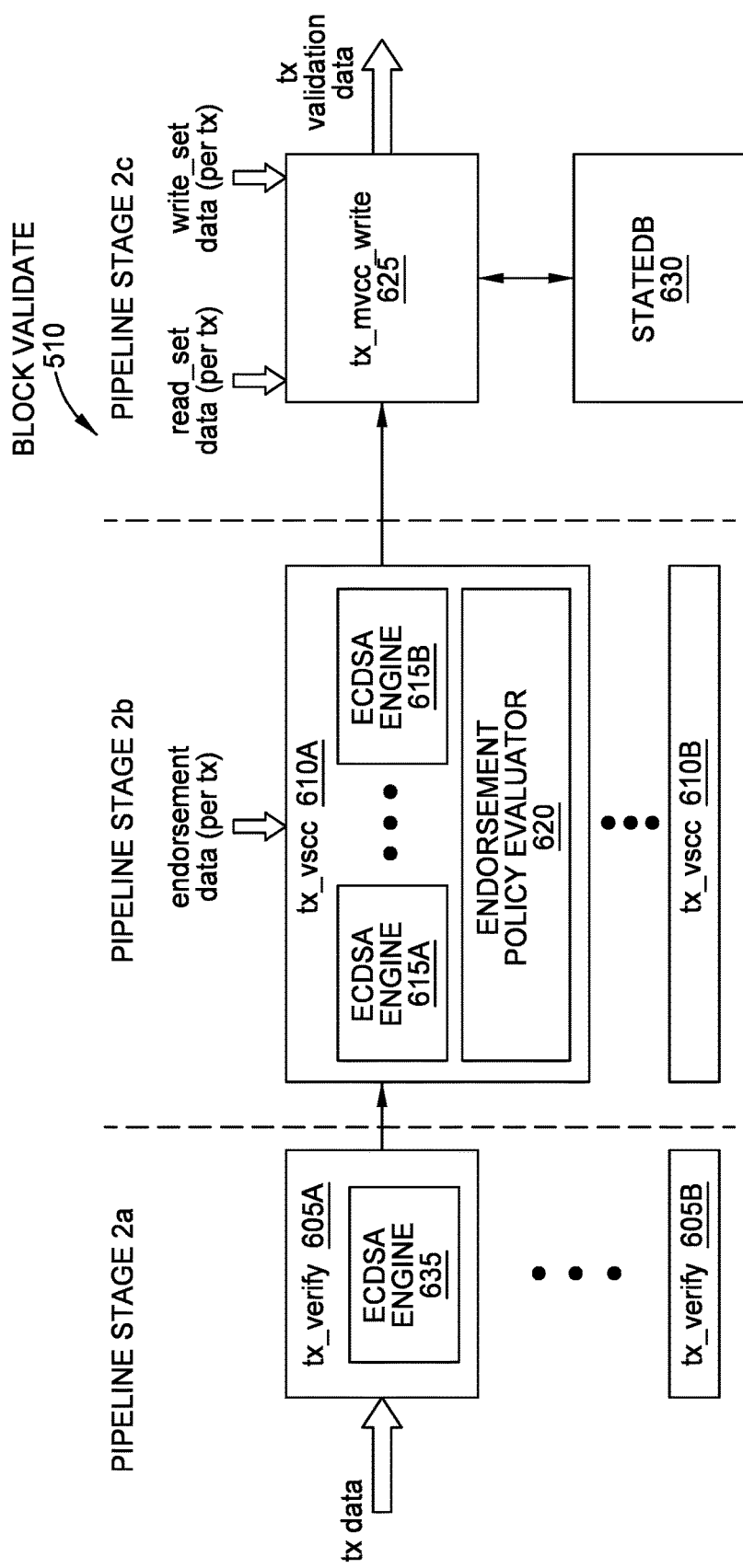
FIG. 6 is a block diagram of a block validate, according to an example.

At stage 415, the first pipeline stage 2a in the block validate 510 verifies the signature of each transaction. As shown in FIG. 6, the stage 2a includes multiple transaction verify blocks 605 which each include an ECDSA engine 635. These engines 635 verify the signature of the client (or creator) of the transaction. That is, the ECDSA engines 635 ensure the transaction was signed by a known client by comparing the received signature to a signature calculated based on tx data and creator's public key pair.

Because there are multiple transaction verify blocks 605, stage 2a can validate the client signatures for multiple transactions in parallel. It is a design choice to determine how many of the transaction verify blocks 605 the block validate 510 includes. Having additional transaction verify blocks 605 means stage 2a can process more transactions in parallel but at a cost of using additional space and power in the accelerator.

Returning to the method 400, at stage 420, the block validate 510 verifies the endorsements of each transaction using an endorsement policy. As shown in FIG. 6, the pipeline stage 2b includes multiple transaction VSCC blocks 610 that each includes multiple ECDSA engines 615 (or any other type of signature verification engine or endorsement verification engine) and an endorsement policy evaluator 620. The transaction VSCC blocks 610 each verifies the endorsements of a particular transaction. To do so, the transaction VSCC blocks 610 receive the endorsement data which includes an endorser ID and verification data. Because a client transaction may receive multiple endorsements (as shown in FIG. 1), each ECDSA engine 615 can evaluate one of the endorsements in parallel. That is, if Transaction A received two endorsements, the ECDSA engine 615A can verify that the first endorsement was signed by an approved endorsing node at the same time the ECDSA engine 615B verifies that the second endorsement was signed by an approved endorsing node. Again, the number of ECDESA engines 615 in each block 610 is a design choice.

In one embodiment, the endorsement policy evaluator 620 may maintain endorsement policies on a per-chaincode basis. The evaluator 620 confirms that the transaction has received the appropriate endorsements. That is, assuming the endorsements were given by approved endorsing nodes, the evaluator 620 confirms the transaction received endorsements from the appropriate endorsing nodes. For example, if the transaction indicates that money should be transferred between two banks, the evaluator 620 may check to ensure the transaction received endorsements from endorsing nodes operated by both of those banks. If the transaction was endorsed by endorsing nodes for only one bank, or by a different bank not affected by the transaction, the evaluator 620 may invalidate the transaction.

Because stage 2b include multiple transaction VSCC blocks 610, the block validate 510 can verify the endorsements for multiple transactions in parallel. That is, after stage 2a verifies that the transactions were originated by approved clients, stage 2b can verify that the endorsements for the transactions are valid and satisfy one or more endorsement policies. The number of transaction VSCC blocks 610 in the block validate 510 is a design choice.

Returning to the method 400, at stage 425 the block validate 510 performs version check and commits write keys to a state database 630. This is performed by stage 2c which includes a transaction MVCC write block 625 which is communicatively coupled to the state database 630 and the register maps (not shown in FIG. 6). Further, the register maps are optionally coupled to a CPU (not shown) in the node. In one embodiment, the transaction MVCC write block 625 looks up read keys from the state database 630 to perform the version check, and if confirmed, commits updated write keys of valid transactions to the database 630. To do so, the transaction MVCC write block 625 receives the read set data (where each element contains a read key-version pair) and the write set data (where each element contains a write key-value pair) from the protocol processor. In one embodiment, the state database 630 includes an internal lock mechanism to disallow reading of the key that is current being written (or updated).

The stages 2a-2c in FIG. 6 can be pipelined. That is, while FIG. 5 illustrates a block-level pipeline between the block verify 505 and the block validate 510, FIG. 6 illustrates that a transaction-level pipeline where the transactions in a particular block can be processed in parallel in the stages 2a-2c. That is, stage 2a can process a first set of transactions in a block, while stage 2b processes a second set of transactions in the same block, and stage 2c processes a third set of transactions in the same block. However, in one embodiment, because of dependency between transactions, the block validate 510 may process only transactions from the same block. That is, one stage in the block validate 510 may not be able to process transactions from a first block while a different stage processes transactions from a second block.

Figure 7:
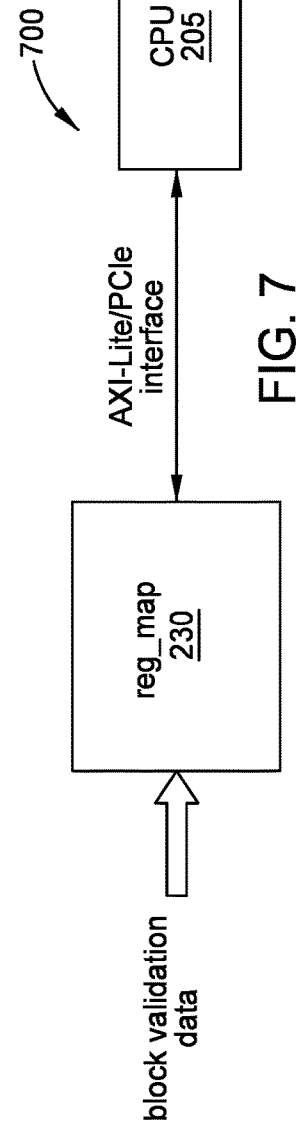
FIG. 7 illustrates communication between registers in the hardware accelerator and a CPU, according to an example.

Returning to the method 400, at stage 430 the block validate 510 stores results of performing the validation process in the registers (e.g., the register map 230). As shown in FIG. 7, the register map receives block validation data from the block validate 510 which may contain block number, valid/invalid transaction flags, latency (as measured by the block monitor), and the like. The validation results are written in the register map where the CPU 205 can use an AXI-lite or a PCIe interface to access the validation results. In one embodiment, new validation results cannot be written into the register map 230 until the currently stored validation results have been read out by the CPU 205. Further, while FIG. 7 illustrates a system 700 where the register map 230 in the hardware accelerator is accessible by the CPU 205, as mentioned above, the accelerator may not use the CPU 205, and can instead complete the validation process without the aid of software executing on the CPU 205.

At stage 435, the CPU (or the hardware accelerator) informs the client whether the transactions are valid or invalid. That is, the CPU can evaluate the validation results to determine whether each individual transaction in the block of transactions was validated. The client may then choose to resubmit the invalid transactions.

At stage 440, the transactions are committed to the ledger. In one embodiment, both the valid and invalid transactions are committed to the ledger, and can include valid/invalid flags to indicate whether the committed transactions are valid or not.

Out-of-Order Transactions

As discussed above, FIG. 6 illustrates using multiple copies of transaction verify blocks 605 and transaction VSCC blocks 610 to generate different pipelines for processing transactions in a block. These pipelines are referred to as validation pipelines that can validate different transactions in parallel. However, it may be important to commit the transactions (as discussed at stage 425 of the method 400) in the order they are identified in the block. For example, the block may contain a first transaction indicating that X dollars have been removed from Account Y and a second transaction indicating that X dollars have been removed from Account Y. If Account Y only has X dollars, then the first transaction (which is first in time) should be validated while the second transaction should not. To achieve this result, the first transaction should be committed before the second transaction.

However, validating the transaction in order can result in an inefficient use of the hardware resources. For example, assume that the first transaction is validated by a first one of the validation pipelines in FIG. 6 while the second transaction is validated by a second one of the validation pipelines. If the second validation pipeline finishes validating the second transaction before the first validation pipeline finishes the first transaction, the second validation pipeline waits to submit the second transaction to MVCC write block 625 until after the first validation pipeline has submitted the first transaction to the MVCC write block 625. While this preserves the ordering of the transactions in the block, it also means the second validation pipeline remains idle until all the previous transactions in the block have been validated.

In many applications, the transactions may have different endorsement policies which means it takes very different times to validate each transaction. For example, a first transaction may require four endorsements while a second transaction requires only two endorsements. Thus, if the first transaction is listed in the block before the second transaction, it is likely the validation pipeline validating the second transaction will remain idle while waiting for the first transaction to be validated. To mitigate or avoid this idle time, FIGS. 8-10 describe an out-of-order validation scheme where validation pipelines that finish validating a transaction are not stalled while waiting for a previous transaction to be validated. Moreover, the embodiments below ensure the transactions are still committed in order. That is, the transactions can be validated out of order but then committed in order by the MVCC write block 625.

Figure 8:
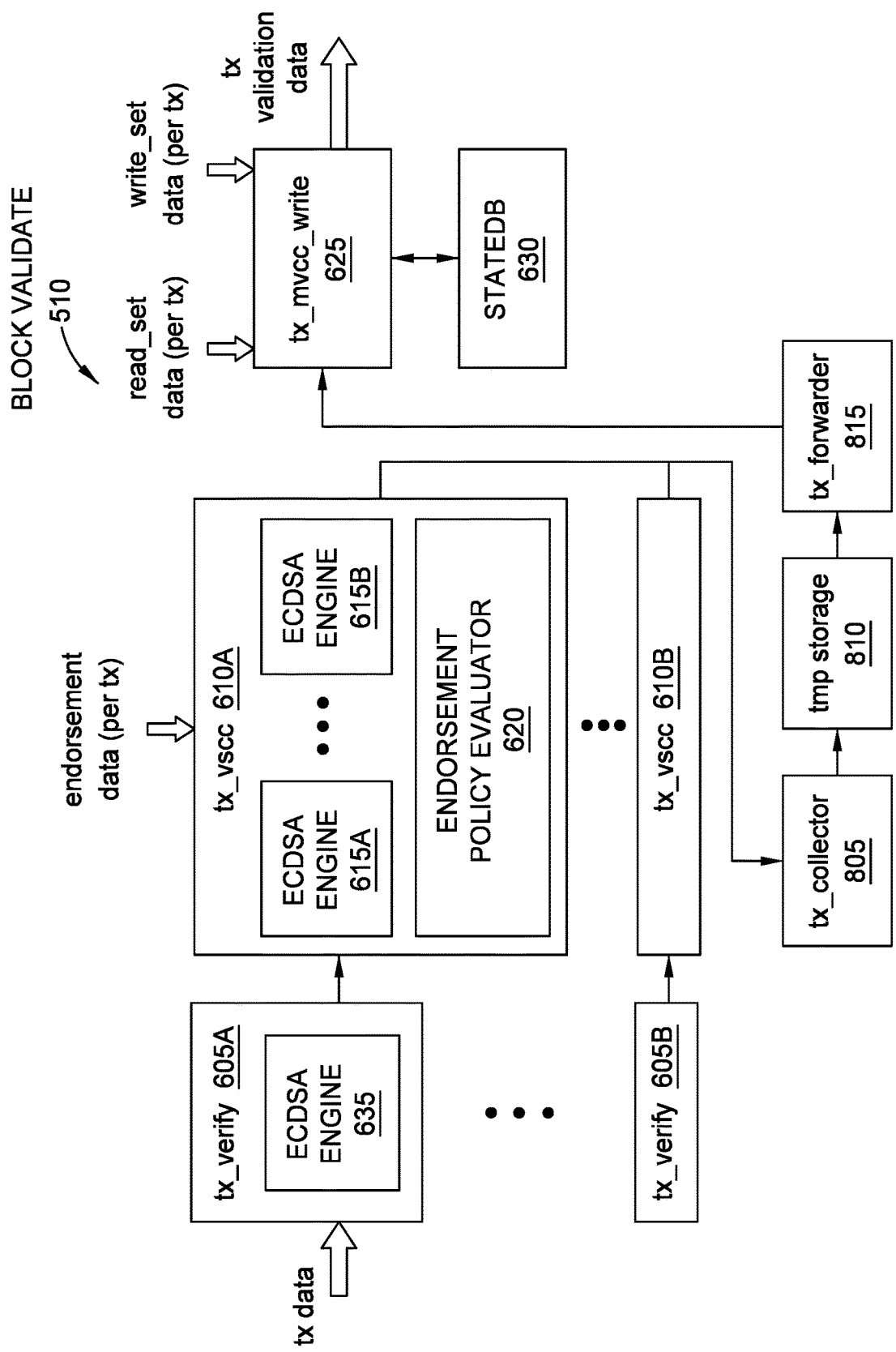
FIG. 8 is a block diagram of a block validate with out-of-order support, according to an example.

FIG. 8 is a block diagram of a block validate 510 with out-of-order support, according to an example. The block validate 510 of FIG. 8 is similar to the block validate 510 in FIG. 6, where the same reference numbers are used to indicate the same functionalities. However, instead of the transaction VSCC blocks 610 being directly connected to the MVCC write block 625, in FIG. 8 the transaction VSCC blocks 610 are coupled to a collector block 805 (e.g., a collector circuit). The collector block 805 accepts out of order transactions. When receiving a block of transactions, each of the transactions may be assigned a sequence number so that the transactions have an order in the block—e.g., Transaction 1, Transaction 2, Transaction 3, etc. As discussed below, the collector block 805 can accept the validation results of the transactions in an out of order sequence.

For example, assume the transaction VSCC block 610A is assigned to validate Transaction 1 while the transaction VSCC blocks 610B is assigned to validate Transaction 2 which occurs later in the block of transactions. If the transaction VSCC block 610B finishes validating Transaction 2 first, the transaction VSCC block 610B can immediately forward the results to the collector block 805. That is, the transaction VSCC block 610B does not have to wait for the transaction VSCC block 610A to finish validating Transaction 1. While the transaction VSCC block 610A continues to validate Transaction 1, the transaction VSCC block 610B can begin to validate another transaction from the block. In this manner, the transaction VSCC block 610B can move on to the next transaction (assuming the verify block 605 has finished verifying another transaction) without waiting on a previous transaction to be validated by another validation pipeline in the block validate 510.

The output of the collector block 805 is coupled to a temporary (tmp) storage 810. The tmp storage 810 can be a register file that stores the results of the validation process performed by the verify blocks 605 and the transaction VSCC blocks 610. In one embodiment, the tmp storage 810 can be a very small memory that stores the result of validating each transaction. For example, if the blocks of transaction each have 200 transactions, then the tmp storage 810 can be 200 bits, where each bit represents whether validation was successful or not (e.g., a logical 1 indicates a transaction is valid while a logical 0 indicates a transaction is invalid). Thus, advantageously, very little additional memory is used to implement the out-of-order scheme illustrated in FIG. 9.

In one embodiment, the tmp storage 810 can be implemented using a register file that has as many entries as a block has transactions. For example, if the block has 200 transactions, then the register file has 200 entries, where the location or address of the entries corresponds to the sequence of the transaction in the block. In this manner, the tmp storage 810 can store the validation results for each transaction of the block.

In some embodiments it may be desired to store additional information about the validation processor. For instance, the block validate 510 may generate error codes when a transaction is not validated. In that case, the tmp storage 810 may include a byte (or several bytes) of memory to store errors codes for the transactions. In any case, the size of the tmp storage 810 can be very small to minimize the impact the out-of-order scheme has on the hardware system.

In one embodiment, tmp storage 810 can be used to accommodate multiple blocks simultaneously if validating transactions across multiple blocks is desired (instead of just within a single block). In that case, the tmp storage 810 may be larger than when used to validate a single block.

The output of the tmp storage 810 is coupled to a forwarder block 815 (e.g., a forwarder circuit). The forwarder block 815 includes circuitry for ensuring the validated transactions are submitted in order to the MVCC write block 625. For example, when the validation process for Transaction 2 is complete, the forwarder block 815 can determine that the validation process for Transaction 1 is not yet complete (e.g., its entry in the tmp storage 810 has not been populated). Thus, the forwarder block 815 waits to forward the validation information stored in the tmp storage 810 for Transaction 2 to the MVCC write block 625. However, after the forwarder block 815 determines the validation process for Transaction 1 is complete and its information has been forwarded to the MVCC write block 625, the forwarder block 815 can then forward the validation information for Transaction 2 to the MVCC write block 625.

Thus, FIG. 8 illustrates that the collector block 805 can receive the validation information in an out of order manner which permits the validation pipelines to immediately begin to validate other transactions in the block. The forwarder block 815 can then ensure the transactions, which may be validated out of order, are submitted to the MVCC write block 625 to be committed to the state database 630 in order. As such, the ordering of the transaction in the block is maintained.

Figure 9:
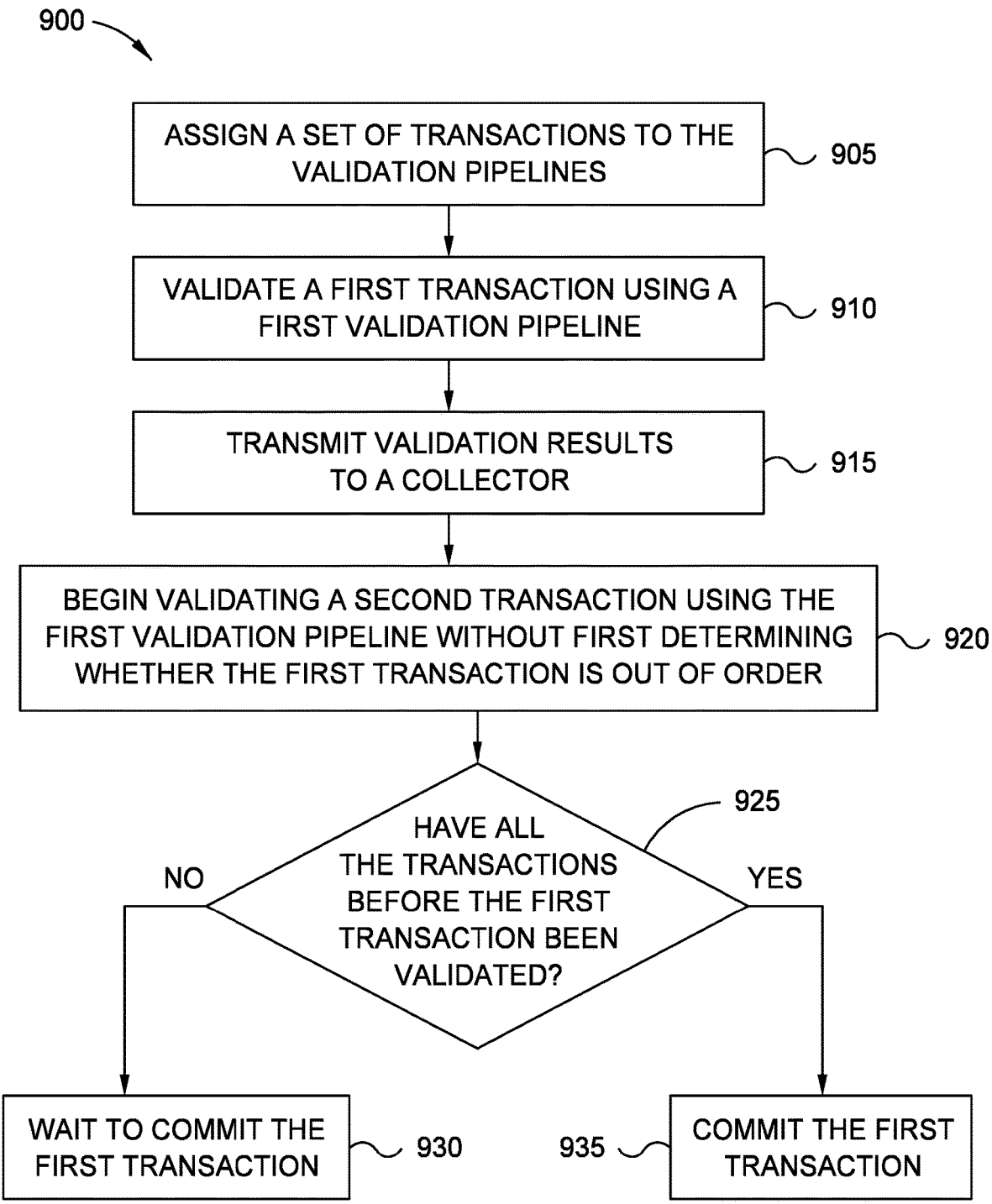
FIG. 9 is a flowchart for validating transactions out-of-order, according to an example.

FIG. 9 is a flowchart of a method 900 for validating transactions out-of-order, according to an example. For clarity, the stages in the method 900 are discussed in tandem with FIG. 10 which is a block diagram of a block validate with out-of-order support.

Figure 10:
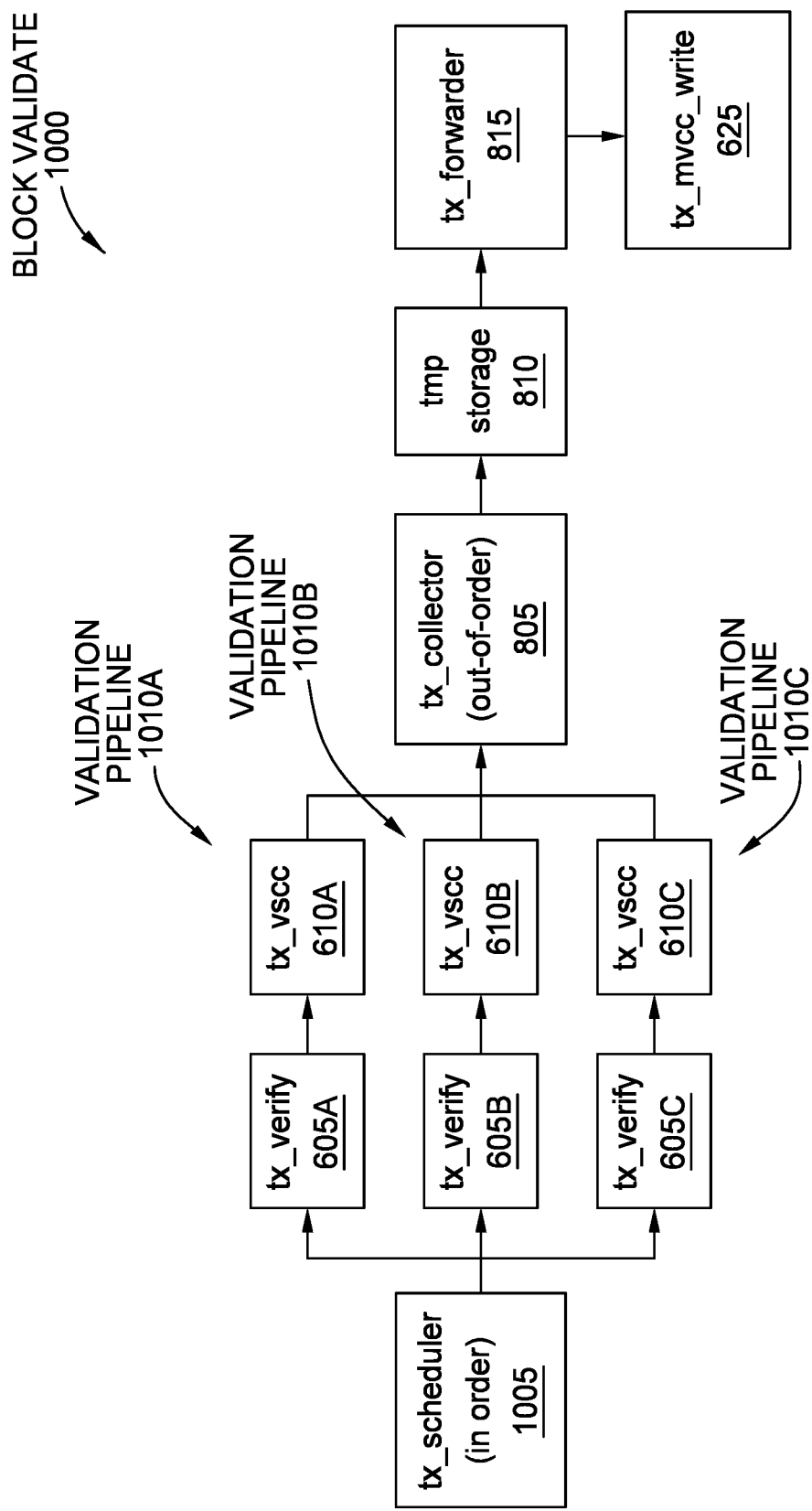
FIG. 10 is a block diagram of a block validate with out-of-order support, according to an example.

At stage 905, a scheduler 1005 assigns a set of transactions to the validation pipelines 1010 in the block validate 1000. In FIG. 10, the block validate 1000 includes three validation pipelines 1010, each including a verify block 605 and a transaction VSCC block 610. While three pipelines 1010 are shown, the block validate 1000 can include any number of pipelines 1010, which is a design choice.

In this embodiment, it is assumed the block validate 1000 has fewer validation pipelines 1010 than there are transactions in the block. For example, the block can include hundreds of transactions while the block validate 1000 includes the three pipelines 1010. Thus, when initially receiving the block of transactions, the scheduler 1005 may assign the first three transactions (i.e., the set of transactions) to the three validation pipelines 1010.

At stage 910, at least one of the validation pipelines 1010 finishes validating a transaction from the set of transactions. In this example, it is assumed the transaction that is validated (i.e., the first transactions) is not the actual first transaction listed in the block. For example, the validation pipelines 10108 or 1010C may finish validating their transactions before the validation pipeline 1010A finishes processing the first actual transaction in the block of transactions.

At stage 915, the validation pipeline transmits the validation results of validating the first transaction to the collector 805. Because the first transaction is not the first actual transaction of the block of transaction, the validation results are being transmitted to the collector 805 in an out-of-order manner. That is, the collector 805 accepts the validation results of the transaction regardless of the actual sequence of the transactions in the block of transactions. The validation results are then stored in the tmp storage 810. For example, the first transaction may have a later sequence number in the block of transactions that another transaction that has yet to be validated by the validation pipelines.

At stage 920, the first validation pipeline begins validating a second transaction without first determining whether the first transaction is out of order. That is, the first validation pipeline is not stalled or does not have to remain idle once it finishes validating a transaction, even if that transaction is validated out of order from an earlier transaction in the block of transactions. Instead, the transaction VSCC block in the first validation pipeline can use a handshake protocol to request another transaction from the verify block 605. For example, the scheduler 1005 may instruct the verify block 605 to send another transaction to the VSCC block in the first validation pipeline. Thus, the method 900 permits the validation pipelines to submit the validation result in an out of order manner to the collector, which then stores those results in the tmp storage 810.

At stage 925, the forwarder 815 determines whether all the transactions before the first transaction have been validated. In this example, it is assumed that at least one validation that was listed in the block before the first transaction has not yet been validated by one of the validation pipelines 1010. For example, the validation pipeline 1010A may still be validating Transaction 1. If so, the method 900 proceeds to stage 920 where the forwarder 815 waits to commit the first transaction.

Once the forwarder 815 determines the previous transaction(s) have been committed, the forwarder 815 then forwards the validation results of the first transaction to the MVCC write block 625. That is, the method 900 can proceed to stage 935 where the first transaction is committed. In one embodiment, the method 900 can perform stages 425-440 to commit the first transaction in an in-order-manner by ensuring the previous transactions in the block of transactions have been committed.

Scheduling Based on Endorsements

As discussed above. FIG. 6 illustrates using multiple copies of transaction verify blocks 605 and transaction VSCC blocks 610 to generate different pipelines for processing transactions in a received block of transactions. These pipelines are referred to as validation pipelines that can validate different transactions in parallel. Instead of using multiple copies of the transaction VSCC blocks 610, the embodiments that follow using a scheduler in a single transaction VSCC block 610 which then assigns a number of engines (e.g., ECDSA engines 615) to the transactions according to the number of endorsements in the transaction. For example, if Transaction 1 includes four endorsements but Transaction 2 includes only two endorsements, then the scheduler may assign four engines to Transaction 1 but only two engines to Transaction 2. Advantageously, this prevents engines in the transaction VSCC blocks 610 from being idle if those blocks 610 have more engines than the current transaction has endorsements. For example, the transaction VSCC block in one of the validation pipelines shown in FIG. 6 may have four ECDSA engines 615 but the current transaction may have only three endorsements. Thus, one of the engines 615 remains unused. However, adding a scheduler can ensure the maximum number of engines in the transaction VSCC block is being used every cycle.

Figure 15:
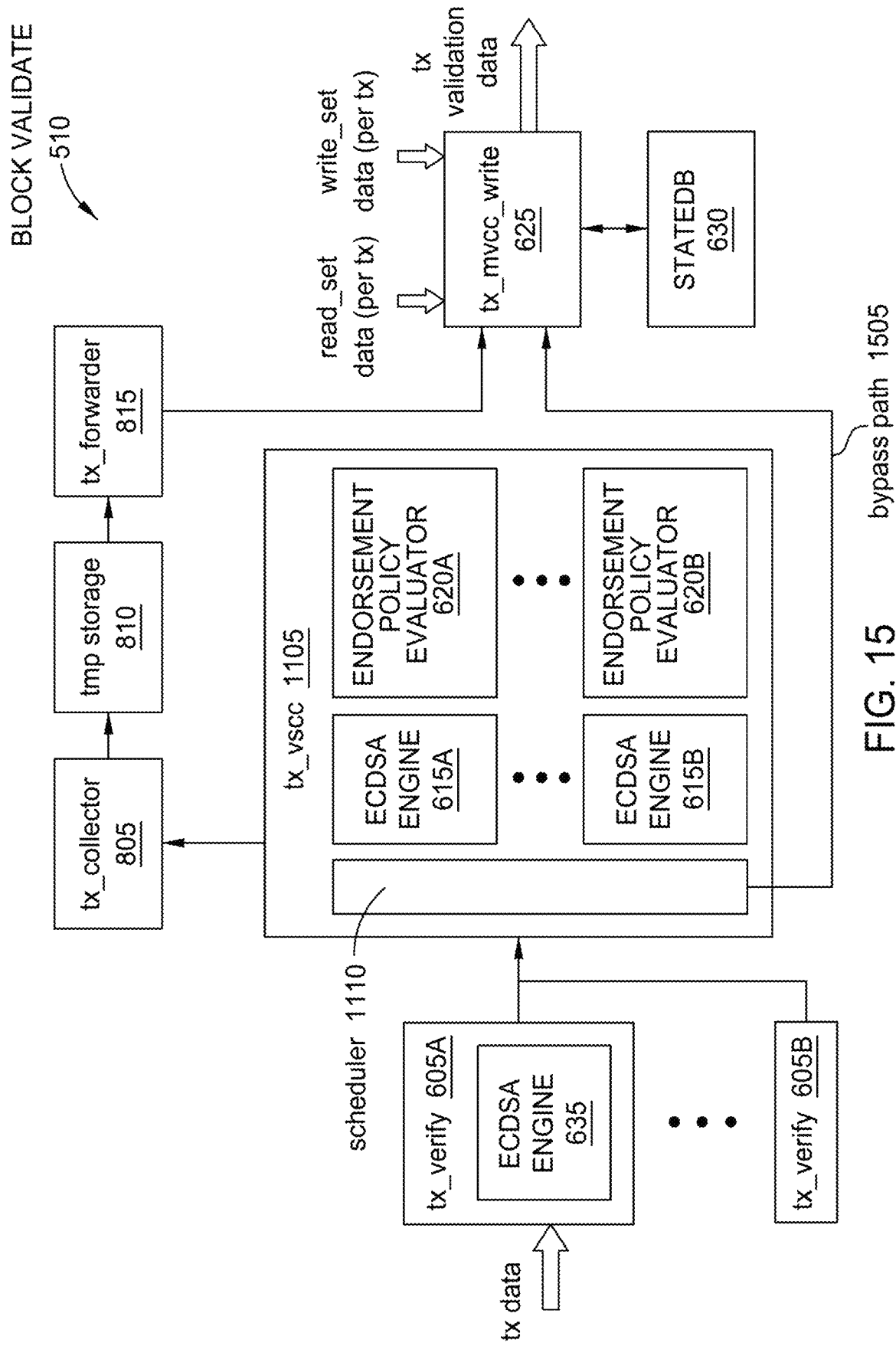
FIG. 15 is a block diagram of a block validate with a scheduler for assigning endorsement engines and includes out-of-order support, according to an example.

In addition to scheduling the transaction in response to its number of endorsements, the scheduler can use a scheduling algorithm that favors the earliest transactions so these transactions are validated first. This enables the block processor to use an in order collector that avoids having idle engines as discussed above. Alternatively, in another embodiment, a more equitable scheduling algorithm can be used which may result in a later transaction being validated before an earlier transaction. In that case, an out-of-order validation scheme can be used. That is, the embodiments shown below can be combined with the out-of-order validation examples discussed above in FIGS. 8-10. This combination is shown in FIG. 15.

Figure 11:
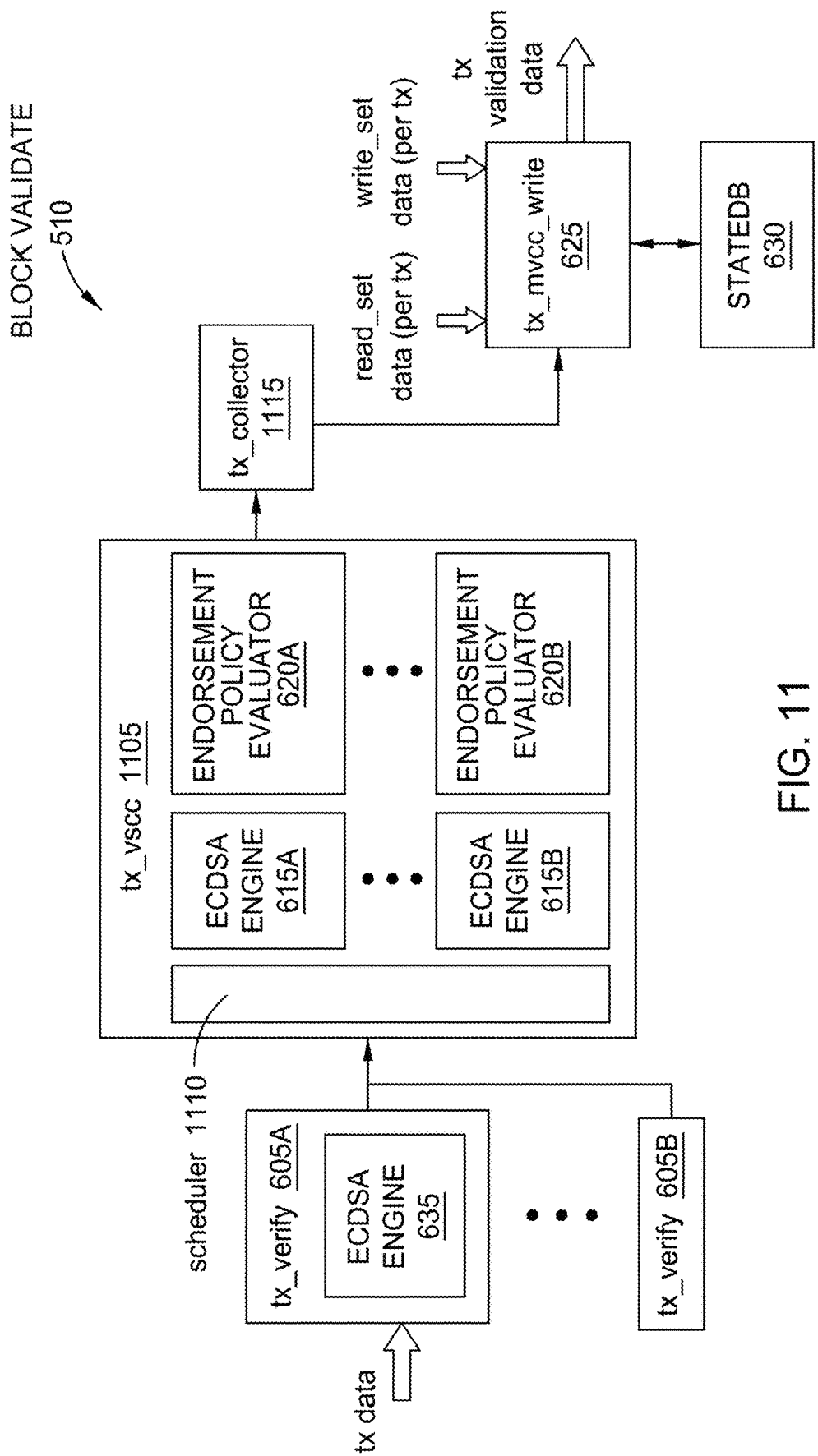
FIG. 11 is a block diagram of a block validate with a scheduler for assigning endorsement engines, according to an example.

FIG. 11 is a block diagram of a block validate 510 with a scheduler for assigning endorsement engines, according to an example. The block validate 510 of FIG. 11 has many of the same hardware components as the block validate 510 in FIG. 6, where the same reference numbers are used to indicate the same functionalities. However, unlike in FIG. 6, in FIG. 11 the block validate 510 includes a single (or shared) transaction VSCC block 1105. That is, instead of the block validate 510 having multiple validation pipelines that each have a respective copy of a transaction verify block 605 and a transaction VSCC block 610, the block validate 510 includes multiple copies of the transaction verify blocks 605 but only one, shared transaction VSCC block 1105. As shown, the output of each of the transaction verify blocks 605 is input into the transaction VSCC block 1105.

The transaction VSCC block 1105 includes a scheduler 1110 that assigns a number of the ECDSA engines 615 to the transaction using the number of endorsements in the transaction. As discussed above, in many transactions, the number of endorsement varies. Rather than providing multiple VSCC blocks with a fixed number of engines, the engines 615 are pooled together in the transaction VSCC block 1105 and then assigned based on actual endorsements of the transactions.

The details of the various scheduling algorithms that can be used by the scheduler 1110 are discussed in more detail below, but as a simple example assume the scheduler 1110 receives Transaction 1 that has three endorsements, Transaction 2 that has two endorsements, and Transaction 3 that has four endorsements. If the scheduler 1110 has ten engines 615, then it can assign three engines 615 to Transaction 1, two engines 615 to Transaction 2, and five engines 615 to Transaction 3. Thus, all three transactions can be validated in parallel in the same cycle. In contrast, if the block validate 510 has separate transaction VSCC blocks like as shown in FIGS. 6 and 8 that each have three engines 615, then Transaction 1 and Transaction 2 would be finished in one cycle, but Transaction 2 would require two cycles to be validated. Even though the transaction VSCC block validating Transaction 2 has an extra engine 615 that is being unused, it cannot be used by Transaction 3 since they are assigned to different VSCC blocks. However, pooling the engines 615 and using the scheduler 1110 shown in FIG. 11 can avoid this situation and result in a more efficient use of the engines 615.

The transaction VSCC block 1105 can also include any number of endorsement policy evaluators 620. However, the number of the endorsement policy evaluators 620 can determine the maximum number of transactions that can be processed in parallel in the transaction VSCC block 1105. That is, at any given time the transaction VSCC block 1105 can only validate as many transactions as there are endorsement policy evaluators 620. Thus, the system designer can set the maximum number of transactions that can be validated by the transaction VSCC block 1105 by setting the number of endorsement policy evaluators 620 in the hardware system.

The block validate 510 includes a collector block 1115 that receives the validation information for each transaction from the transaction VSCC block 1105. However, unlike the collector block 805 in FIG. 8, the collector block 1115 receives the transactions in order. That is, after one of the endorsement policy evaluators 620 informs the collector block 1115 that a transaction has been validated, if the collector block 1115 determines an earlier transaction in the block of transactions (e.g., a transaction with a smaller sequence number) has not yet been validated, the collector block 1115 does not accept the validation information for the transaction. This means the endorsement policy evaluator 620 waits until the earlier transactions has been validated before its validation results are accepted by the collector block 1115 and it is free to be assigned a new transaction by the scheduler 1110. However, as discussed above, the scheduler 1110 can use a scheduling algorithm such that a later transaction is never, or rarely, validated before an earlier transaction. Thus, using an in-order collector block 1115 may not incur any kind of throughput penalty, and can save space in the hardware system relative to an out-of-order collector.

Figure 12:
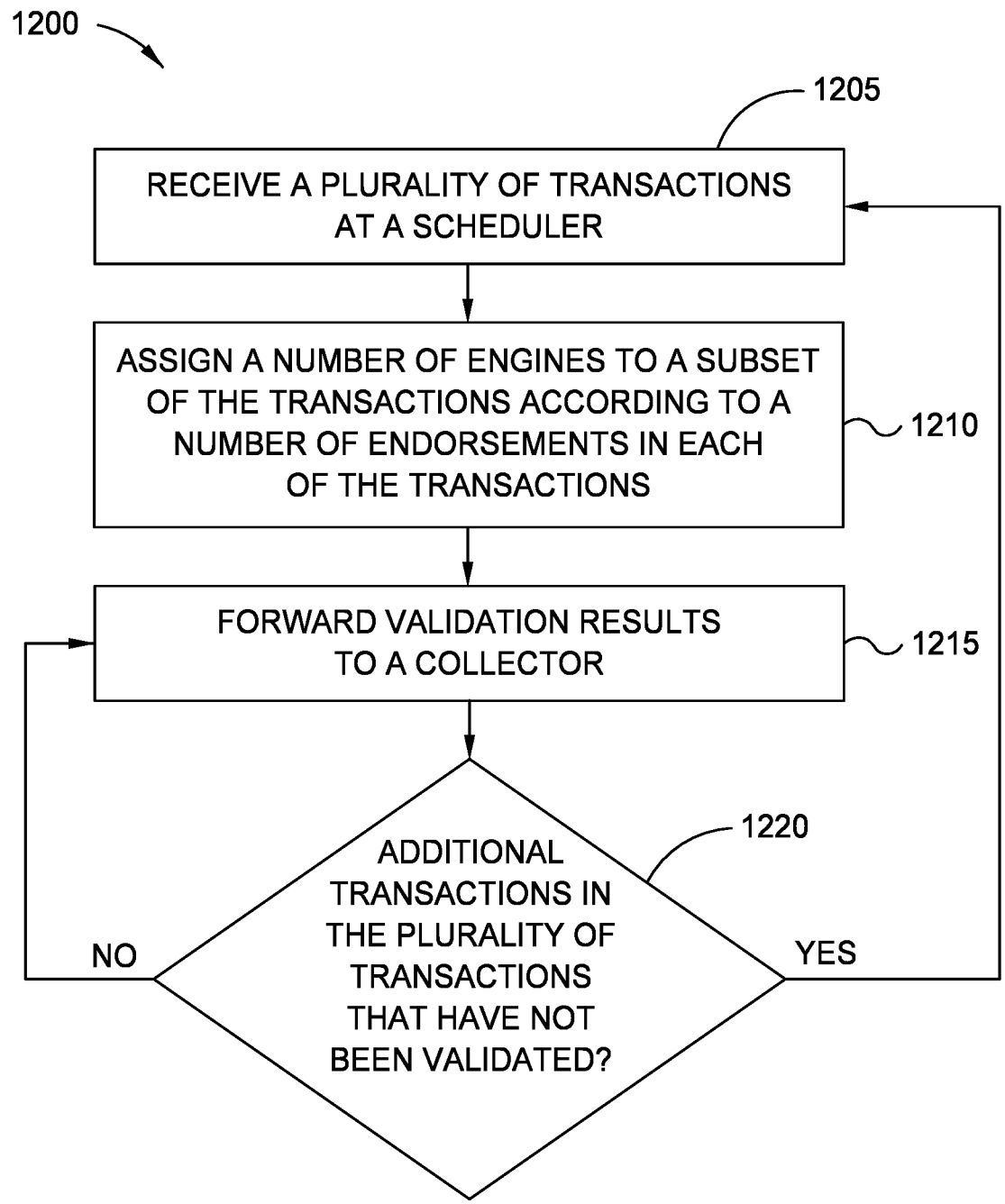
FIG. 12 is a flowchart for validating transactions using a scheduler, according to an example.

FIG. 12 is a flowchart of a method 1200 for validating transactions using a scheduler, according to an example. At stage 1205, the block validate (e.g., the block validate 510 in FIG. 11) receives a plurality of transactions at a scheduler (e.g., the scheduler 1110). In one embodiment, the plurality of transactions have already been verified by transaction verify blocks (e.g., blocks 605 in FIG. 11). Further, the transactions may be part of a block of transactions and may have different sequence numbers.

At stage 1210, the scheduler assigns a number of engines to a subset of the transactions according to a number of endorsements in each of the transactions. For example, the scheduler may receive four transactions from the transaction verify blocks where at least one of the transactions has a different number of endorsements. Because the transaction VSCC block has a set number of engines (e.g., ECDSA engines 615 in FIG. 11) that can validate these endorsements, the scheduler may be able to assign engines only to a subset of the transactions. For example, the transactions may have a total of 20 endorsements but the transaction VSCC block may only have ten engines. Thus, at stage 1210, the scheduler decides which transactions are assigned engines, and how many engines each transaction is assigned. This is discussed in more detail below.

At stage 1215, the endorsement policy evaluators in the transaction VSCC block forward validation results to a collector (e.g., the collector block 1115). In one embodiment, the collector is an in-order collector which requires the endorsement policy evaluators to forward the validation results according to the sequence numbers assigned to the transaction. However, in another embodiment (which is discussed in FIG. 15), the collector may be an out-of-order collector that permits the endorsement policy evaluators to forward the validation results in any order, regardless of the assigned sequence numbers.

Forwarding the validation results to the collector frees both the endorsement policy evaluator and the endorsement engines assigned to the transaction (or transactions). After forwarding the validation results to the collector, the endorsement policy evaluators can notify the scheduler so it knows the endorsement policy evaluators and the corresponding engines are now available to be assigned to another transaction.

At stage 1220, the scheduler determines whether there are additional transactions in the plurality of transactions received at stage 1205 that have not been validated. For example, if the transaction VSCC block did not have enough engines to validate all of the transactions, the method 1200 can return to stage 1210 to assign the engines and the endorsement policy evaluators to other transactions that are waiting.

In one embodiment, the scheduler may have, at stage 1210, assigned fewer engine(s) to a transaction than it has endorsements. For example, a transaction may have four endorsements but the scheduler only assigned two engines. Thus, at stage 1220, the scheduler can assign the same two engines to the transaction (along with the same endorsement policy evaluator) so in the next cycle all the endorsements for the transaction have been validated.

However, as discussed above, different transactions may have different endorsement policies. For example, a transaction may have four endorsements but also has a policy that says only two of the four endorsements must be valid in order to validate the transaction. In that case, continuing the previous example, if the two engines assigned to the transaction indicate both endorsements are valid, then the endorsement policy evaluator can forward the validation results to the collector at stage 1215 without the scheduler having to use the engines to evaluate the remaining two endorsements. The two engines and the endorsement policy evaluator would then be free at stage 1220 to be assigned to a different transaction.

Once all the transactions are validated, the method 1200 returns to stage 1205 where the scheduler waits to receive additional transactions from the transaction verify blocks.

Figure 13:
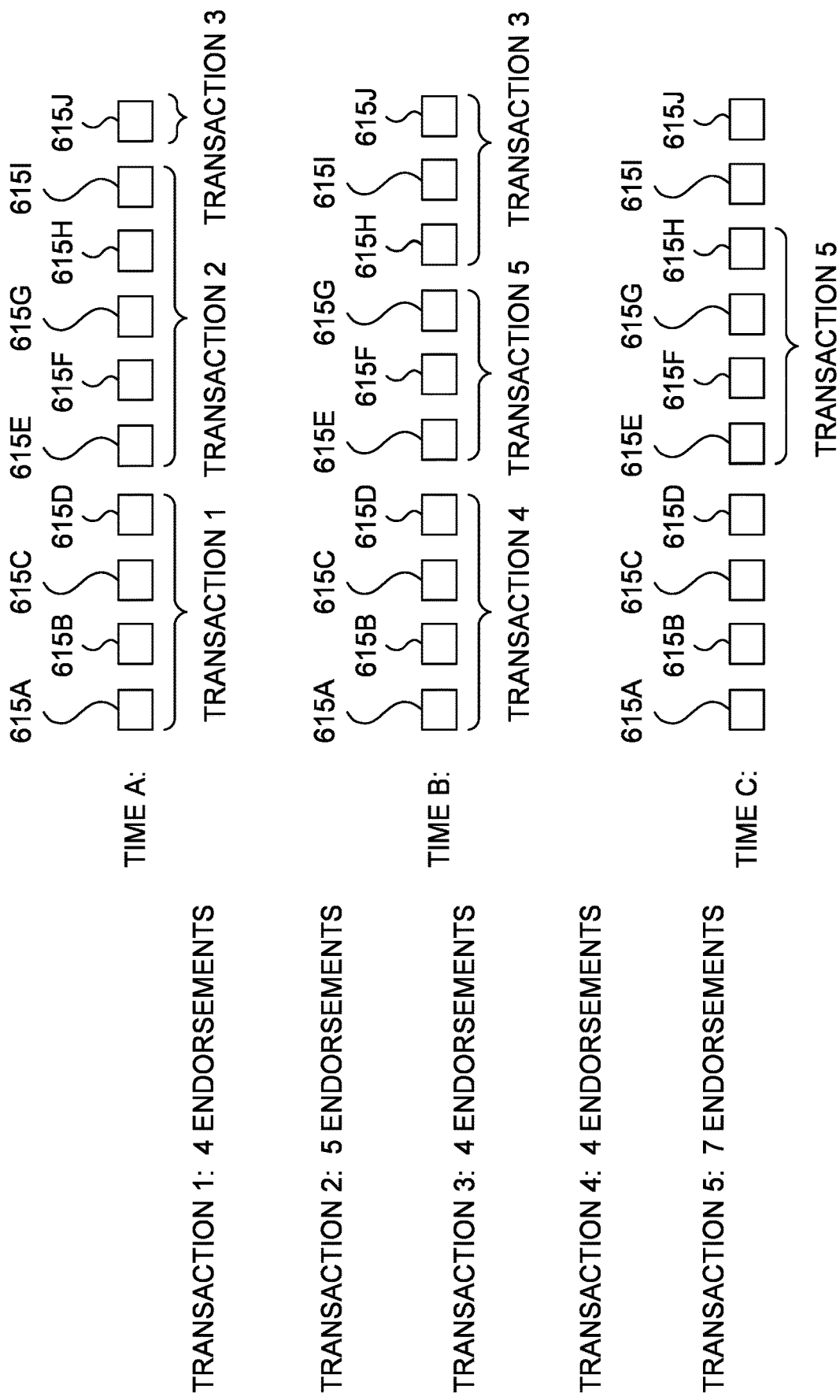
FIG. 13 illustrates scheduling transactions with different endorsements over a period of time, according to an example.

FIG. 13 illustrates scheduling transactions with different endorsements over a period of time, according to an example. FIG. 13 illustrates one example of using the method 1200 in FIG. 12 to assign a limited number of ECDSA engines 615 in the transaction VSCC block to received transactions. In this example, the transaction VSCC block includes ten ECDSA engines 615A-J.

FIG. 13 illustrates that the scheduler has received five transactions that are then validated using three time periods (e.g., three cycles) shown as Time A, Time B, and Time C. The transactions have different numbers of endorsements where Transaction 1 has four endorsements, Transaction 2 has five endorsements, Transaction 3 has four endorsements, Transaction 4 has four endorsements, and Transaction 5 has seven endorsements. For simplicity, it is assumed the endorsement policies for these transactions requires the transaction VSCC block to validate all of the endorsements before the transaction is deemed valid.

At Time A, the scheduler assigns four engines 615A-D to validate the endorsements of Transaction 1, five engines 615E-1 to validate the endorsements of Transaction 2, and one engine 615J to validate one of the endorsements of Transaction 3. In this example, the scheduler assigned the engines 615 to give priority to the earlier transactions to ensure they are validated first. That is, the scheduler first assigned all the endorsements of Transaction 1 to the engines 615, determined there were still engines 615 unassigned, assigned all the endorsements of Transaction 2 to the engines 615, determined there were still engines 615 unassigned, and assigned the remaining engine 615 to Transaction 3. However, this is just one example of assigning engines using the number of endorsements in the transactions. Other algorithms are discussed below.

After the endorsements have been processed by the engines 615 at Time A, the endorsement policy evaluators assigned to Transaction 1 and Transaction 2 now know whether these transaction are valid or invalid and can send the validation results to the collector block. As a result, the engines 615A-I and the endorsement policy evaluators assigned to Transaction 1 and Transaction 2 are now free. However, the endorsement policy evaluator assigned to Transaction 3 does not yet know if this transaction is valid since only one of its endorsements was validated at Time A.

At Time B, the scheduler assigns three engines 615H-J to Transaction 3. That is, this partially validated transaction is prioritized so that its remaining endorsements will be validated in the current cycle. The scheduler can then assign the remaining unassigned engines to additional transactions. As shown, the scheduler assigns engines 615A-D to validate the four endorsements of Transaction 4 and the engines 615E-G to validate three of the seven endorsements for Transaction 5.

At the end of this cycle, the endorsement policy evaluators assigned to Transaction 3 and Transaction 4 now know whether these transactions are valid or invalid and can send the validation results to the collector block. As a result, the engines 615A-D and 615H-J and the endorsement policy evaluators assigned to Transaction 3 and Transaction 4 are now free. However, the endorsement policy evaluator assigned to Transaction 5 does not yet know if this transaction is valid since only three of its endorsements were validated at Time B.

At Time C, the scheduler assigns four engines 615E-H to Transaction 5 to validate its remaining four endorsements. The other engines (i.e., 615A-D and 615I-J) can be assigned to other transactions if any have been received at the scheduler.

FIG. 13 illustrates that when a transaction is only partially validated in a cycle, the same engines (plus additional engines, if needed) are assigned to the transaction in the next cycle. That is, Transaction 3 is assigned the engine 615J at both Time A and Time B. Similarly, Transaction 5 is assigned the engines 615E-G at both Time B and Time C. This may result in additional computational efficiency, but is not a requirement.

Figure 14:
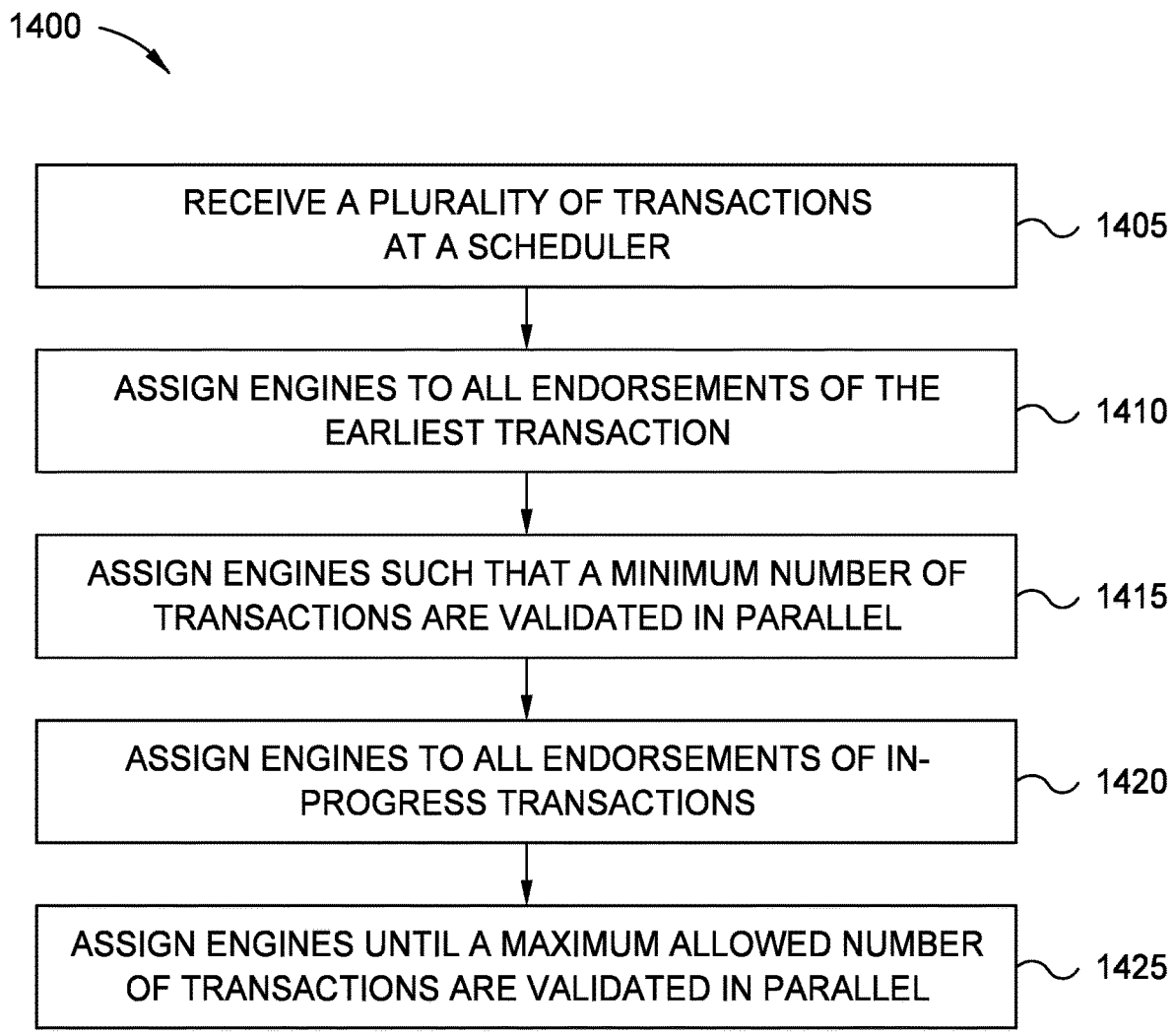
FIG. 14 is a flowchart for validating transactions using a scheduler, according to an example.

FIG. 14 is a flowchart of a method 1400 for validating transactions using a scheduler, according to an example. The method 1400 is one other example of a scheduling algorithm that may be used by the scheduler in the transaction VCSS block.

At stage 1405, the block validate (e.g., the block validate 510 in FIG. 11) receives a plurality of transactions at a scheduler (e.g., the scheduler 1110). In one embodiment, the plurality of transactions have already been verified by transaction verify blocks (e.g., blocks 605 in FIG. 11). Further, the transactions may be part of a block of transactions and have different sequence numbers.

At stage 1410, the scheduler assigns engines to all endorsements of the earliest transaction. That is, the scheduler can view the sequence number of the received transactions and assign all the endorsements for the transaction with the lowest number. Assuming the transaction VCSS block has sufficient endorsement engines, doing so ensures that the earliest transaction will be validated by the next cycle. This is advantageous in a block validate such as shown in FIG. 11 where the collector block 1115 receives the transactions in order. If multiple transactions are validated at the same cycle, prioritizing the endorsement of the earliest transaction ensures other validated transactions are not held up while the collector block waits for the earliest transaction.

Assuming there are still unassigned engines after performing stage 1410, at stage 1415 the scheduler assigns engines such that a predefined minimum number of transactions is being validated in parallel. For example, if the transaction VCSS block has six remaining engines and there are three remaining transactions that each have four endorsements, the scheduler may assign the engines among the transactions to ensure the minimum number of transactions are being processed. For instance, if the minimum number is four (and assuming the first transaction has already been scheduled), the scheduler can assign two engines to each of the three remaining transactions. If the minimum number of transactions was instead three, the scheduler may have assigned three engines to the second and third transactions and none to the fourth transaction.

Ensuring there is a minimum number of transactions being validated can be efficient when a transaction is invalid. For example, if the second transaction was instead assigned four of the six remaining engines but the first endorsement in the second transaction was invalid, then processing the other three endorsements in parallel was a waste of the engines (assuming that all four of the endorsements must be valid for the transaction to be valid). Instead, the minimum number of transactions setting can be used to spread out the remaining engines. That way, if one of the first endorsements that is processed is invalid, the endorsement policy evaluator for that transaction can perform an early exit and inform the scheduler that the remaining endorsements do not need to be processed.

Assuming there are available engines after performing stages 1410 and 1415, at stage 1420 the scheduler assigns engines to all endorsement of in-progress transactions. That is, if the transaction VCSS block processed only some of the endorsements for the transaction during the previous cycle, the scheduler can prioritize this transaction to attempt to assign all the remaining endorsements for that transaction in the current cycle.

Assuming there are available engines after performing stages 1410, 1415, and 1420, at stage 1425 the scheduler assigns engines until a maximum allowed number of transactions are being validated in parallel. In one embodiment, the number of maximum allowed transactions is set by the number of endorsement policy evaluators in the transaction VCSS block. For example, if the transaction VCSS block has five endorsement policy evaluators and sixteen ECDSA engines, if the scheduler receives eight transactions that each have two endorsements, the scheduler can only validate five of the eight transactions since it has only five endorsement policy evaluators. In that case, ten of the sixteen engines would be used while the other six engines would be idle. The number of endorsement policy evaluators is a tradeoff between the amount of circuitry needed to implement the evaluators (which takes up space in the hardware system) versus the number of maximum transactions the transaction VCSS block can validate in parallel.

The method 1400 is just one example of a scheduling algorithm that can be used by the scheduler. For example, this scheduling algorithm may be preferred when using an in-order collector. However, a system designer may decide to tweak the scheduler based on knowledge of the particular transactions that are being validated. For example, if the endorsement policies for the transaction state that only two valid endorsements are required before a transaction is deemed valid, then the scheduler may never assign more than two engines to a particular transaction. For example, the transactions may have more than two endorsements (e.g., three, four, five, etc.) but the scheduler may assign only two engines to each transaction during a particular cycle. This is because it is typically rare for an endorsement to be invalid. Thus, assigning additional engines to an transaction to validate three, four, or five endorsements in parallel in the same cycle will often waste resources since two engines is typically sufficient. If one of the endorsements is invalid, then the scheduler can assign an engine (or multiple engines) to process the remaining endorsements in the transaction in the next cycle.

In another example, the scheduling algorithm may be adjusted during runtime by logic in the scheduler, or by the system designer. In one embodiment, the transaction VCSS block compiles a history of the validations. Using this information, the scheduler can adjust the scheduling algorithm. For example, the history may track which endorsements in the transaction were valid and which were invalid. The history may indicate that for transactions with four endorsements, the first endorsement and the fourth endorsement are almost always valid (e.g., a greater than 95% validation rate) while the second and third endorsements have a lower validation rate (e.g., a less than 75% validation rate). If the endorsement policy indicates that two out of the four endorsements must be valid in order for the transaction to be valid, then the schedule can adjust its scheduling algorithm to assign at most two engines to the transactions for a cycle and to validate the first and fourth endorsements first. In this example, the scheduler learned from the history that the first and fourth endorsements are very likely valid, and thus, processing these endorsements first will likely lead to validating the transaction without having to also process the second and third endorsements. In this manner, circuitry in the scheduler can evaluate the history and adjust the scheduling algorithm on the fly automatically, without human intervention. Alternatively, a system designer can evaluate the history and use this information to manually adjust the scheduling algorithm.

FIG. 15 is a block diagram of a block validate 510 with a scheduler 1110 for assigning endorsement engines and includes out-of-order support, according to an example. The transaction VSCC block 1105 in FIG. 15 is the same as the transaction VSCC block 1105 in FIG. 11. However, instead of having an in-order collector block, the block validate 510 in FIG. 15 has an out-of-order collector block 805, which was described in FIG. 8. The collector block 805 permits the endorsement policy evaluators 620 to submit validation results in any order (i.e., without first ensuring the transactions with lower sequence numbers have already been validated). These validation results are stored in the tmp storage 810 and then submitted in order by the forwarder block 815 to the transaction MVCC write block 625. Thus, FIG. 15 illustrates a combination of the single (or shared) transaction VSCC block 1105 being used with an out-of-order collection scheme implemented by the collector block 805, the tmp storage 810, and the forwarder block 815. Such a combination may be desired if the scheduling algorithm used by the scheduler 1110 does not prioritize the earliest transaction in the block of transactions. For example, the scheduler 1110 may assign the same number of engines to the transactions (regardless of their order) to maximum the number of transactions that are validated in parallel in the transaction VSCC block 1105.

FIG. 15 also illustrates a bypass path 1505 between the scheduler 1110 and the transaction MVCC write block 625. The bypass path 1505 can be used when one of the transaction verify blocks 605 indicate a particular transaction was not verified. That is, the engine 635 in the transaction verify block 605 was unable to verify the signature of the client (or creator) of the transaction. When this information is relayed to the scheduler 1110, the scheduler 1110 knows the transaction is already invalid and does not need to validate the endorsements in the transaction using the ECDSA engines 615. The scheduler 1110 can discard the endorsement data for that transaction that is received at the transaction VSCC block 1105. Moreover, the transaction MVCC write block 625 also receives read_set data and write_set data for the invalid transaction. Thus, the bypass path 1505 permits the scheduler 1110 to inform the transaction MVCC write block 625 (e.g., a downstream circuit) that the transaction is invalid so it can discard the read and write data for the transaction, while also bypassing the ECDSA engines 615, the endorsement policy evaluators 620, and the out-of-order or in-order collection schemes (depending on which is used). Discarding the read and write data from the FIFOs at the transaction MVCC write block 625 allows the read and write data for the next transaction to become available.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
    a hardware accelerator circuit, comprising:
        a scheduler configured to assign sequence numbers to transactions of a block of blockchain transactions based on an ordering of the transactions within the block;
        a plurality of multi-stage pipeline validation circuits configured to validate the transactions of the block in parallel, wherein each of the validation circuits is further configured to output validation results of a preceding transaction and receive a subsequent transaction of the block for validation upon validation of the preceding transaction, and wherein two or more of the transactions of the block comprise differing numbers of endorsements such that the one or more of the transactions of the block are validated in an out-of-order sequence relative to the sequence numbers;
        a collector circuit configured to receive the validation results from the multi-stage pipeline validation circuits in the out-of-order sequence; and
        a forwarder circuit configured to submit the validation results to be committed to a blockchain in an ordered manner based on the sequence numbers.

2. The integrated circuit of claim 1, wherein the multi-stage pipeline validation circuits comprise a transaction verification stage that comprises:
    multiple endorsement circuits configured to verify endorsements of the transactions in parallel; and
    wherein the scheduler is further configured to assign the transactions to the endorsement circuits based on the sequence numbers, and to assign numbers of the endorsement circuits to the transactions based on numbers of endorsements of the respective transactions.

3. The integrated circuit of claim 1, wherein the forwarder circuit is configured to determine that all transactions with a sequence number lower than a sequence number of a first transaction have been committed to the blockchain before committing the first transaction to the blockchain.

4. The integrated circuit of claim 1, wherein the hardware accelerator circuit further comprises:
    a network interface configured to receive a plurality of packets containing the block of transactions from a node in the blockchain;
    a protocol processor configured to parse the packets to generate data regarding the transactions; and
    a block processor coupled to the protocol processor, the block processor comprising the multi-stage pipeline validation circuits, the collector circuit, and the forwarder circuit.

5. The integrated circuit of claim 4, wherein block processor further comprises:
    a block verify circuit comprising a first signature algorithm engine configured to verify orderer signatures of the blocks; and
    a block validate circuit comprising the multi-stage pipeline validation circuits, the collector circuit, and the forwarder circuit.

6. The integrated circuit of claim 5, wherein each of the multi-stage pipeline validation circuits comprises:
    a transaction verify stage configured to verify client signatures of the blocks of transactions; and
    a transaction validation stage configured to verify endorsements of the transactions based on an endorsement policy.

7. The integrated circuit of claim 5, wherein the block validate circuit further comprises:
    a transaction multi-version concurrency control (MVCC) write circuit configured to read and write key-value pairs associated with the transactions in a state database, wherein the transaction MVCC write circuit is coupled to an output of the forwarder circuit.

8. The integrated circuit of claim 1, wherein the multi-stage pipeline validation circuits comprise:
    a plurality of transaction verify circuits configured to operate in parallel to verify signatures of a first set of the plurality of received transactions; and
    a plurality of transaction validation system chaincode (transaction VSCC) circuits configured to operate in parallel to verify endorsements of a second set of the plurality of received transactions,
    wherein the transaction verify circuits form first stages of the multi-stage pipeline validation circuits, and wherein the transaction VSCC circuits form second stages of the multi-stage pipeline validation circuits such that the transaction verify circuits processes the first set of transactions as the transaction VSCC circuits processes the second set of transactions.

9. The integrated circuit of claim 8, wherein each of the plurality of transaction verify circuits comprises a plurality of algorithm signature engines for verifying a set of endorsements of one of the transactions in parallel.

10. The integrated circuit of claim 1, wherein the integrated circuit comprises at least one of a system on a chip (SoC), a field programmable gate array (FPGA), and an application specific integrated circuit (ASIC).

11. A method, comprising:
    assigning sequence numbers to a transactions of a block of blockchain transactions based on an ordering of the transactions within the block, by a hardware accelerator circuit;
    validating the transactions of the block in parallel using a plurality of multi-stage pipeline validation circuits of the hardware accelerator circuit, including, for each of the validation circuits, outputting validation results of a preceding transaction and receiving a subsequent transaction of the block for validation upon validation of the preceding transaction, and wherein two or more of the transactions of the block comprise differing numbers of endorsements such that the one or more of the transactions of the block are validated in an out-of-order sequence relative to the sequence numbers;
    transmitting the validation results in the out-of-order sequence, from the plurality of validation pipelines to a collector circuit of the hardware accelerator circuit; and committing, using a forwarder circuit of the hardware accelerator circuit, the transactions to the ledger in an ordered manner based on the sequence numbers.

12. The method of claim 11, wherein the multi-stage pipeline validation circuits comprise a scheduler and a transaction verification stage that comprises multiple endorsement circuits, and wherein the validating comprises:
scheduling the endorsements of the transactions to respective ones of the endorsement engines based on the sequence numbers;
assigning numbers of the endorsement circuits to the transactions based on numbers of endorsements of the respective transactions; and
verifying the endorsements in the respective endorsement circuits, in parallel.

13. The method of claim 11, further comprising:
determining, using the forwarder circuit, that all transactions with a sequence number lower than a sequence number of a first transaction have been committed to the blockchain before committing the first transaction to the ledger.

14. The method of claim 11, further comprising:
receiving a plurality of packets containing the block of transactions from a node in the blockchain, by a network interface device;
parsing the plurality of packets, by a protocol processor, to generate data regarding the transactions; and
providing the data regarding the transactions to the hardware accelerator circuit.

15. The method of claim 11, wherein the validating further comprises:
verifying an orderer signature of the block.

16. The method of claim 15, wherein the validating further comprises:
verifying client signatures of the transactions;
verifying endorsements of the transactions; and
ensuring the endorsements satisfy an endorsement policy.

17. The method of claim 11, further comprising:
reading and writing key-value pairs associated with the transactions in a state database using a transaction multi-version concurrency control (MVCC) write circuit in the hardware accelerator.

18. The method of claim 11, wherein the multi-stage validation circuits comprise:
a plurality of transaction verify circuits configured to operate in parallel to verify signatures of a first set of the transactions; and
a plurality of transaction validation system chaincode (transaction VSCC) circuits configured to operate in parallel to verify endorsements of a second set of the transactions,
wherein the transaction verify circuits form first stages of the multi-stage pipeline validation circuits and the transaction VSCC circuits form second stages of the multi-stage pipeline validation circuits such that the transaction verify circuits process the first set of the transactions as the transaction VSCC circuits process the second set of the transactions.

19. The method of claim 18, wherein each of the plurality of transaction verify circuits comprises a plurality of algorithm signature engines for verifying a set of endorsements in one of the plurality of transactions in parallel.

20. The method of claim 11, wherein the hardware accelerator comprises one or more of a system on a chip (SoC), a field programmable gate array (FPGA), and an application specific integrated circuit (ASIC) that contains the plurality of validation pipelines, the collector circuit, and the forwarder circuit.

* * * * *